US012782685B2

(12) United States Patent
Kuo et al.

(10) Patent No.: US 12,782,685 B2
(45) Date of Patent: Nov. 3, 2026

(54) OPTICAL LENS AND DISPLAY DEVICE

(71) Applicant: Coretronic Corporation, Hsin-Chu (TW)

(72) Inventors: Tao-Hung Kuo, Hsin-Chu (TW); Po-Che Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 1158 days.

(21) Appl. No.: 17/828,042

(22) Filed: May 31, 2022

(65) Prior Publication Data

US 2022/0390719 A1 Dec. 8, 2022

(30) Foreign Application Priority Data

May 31, 2021 (CN) ......................... 202110599987.3

(51) Int. Cl.
*G02B 13/00* (2006.01)
*G02B 9/60* (2006.01)
(Continued)

(52) U.S. Cl.
CPC ........... *G02B 13/0045* (2013.01); *G02B 9/60* (2013.01); *G06F 1/163* (2013.01); *H04N 13/332* (2018.05); *G02B 6/0055* (2013.01)

(58) Field of Classification Search
CPC .... G02B 13/0045; G02B 9/60; G02B 6/0055; G02B 2027/0116; G02B 13/00;
(Continued)

(56) References Cited

U.S. PATENT DOCUMENTS 8,587,869 B2 11/2013 Totani et al.
2015/0301318 A1* 10/2015 Ivanisov .................. G02B 9/10 359/717
(Continued)

FOREIGN PATENT DOCUMENTS

CN 102540422 7/2012
CN 104516089 4/2015
(Continued)

OTHER PUBLICATIONS

"Search Report of Europe Counterpart Application", issued on Feb. 1, 2023, pp. 1-8.
(Continued)

*Primary Examiner* — Jennifer D. Carruth
(74) *Attorney, Agent, or Firm* — JCIPRNET

(57) ABSTRACT

The invention provides an optical lens including a first lens, a second lens, a third lens, a fourth lens, and a fifth lens with refracting power in order from a light incidence side to a light-emitting side along an optical axis, and at least one glass lens is included. The first lens has a positive refracting power, the second lens has a positive refracting power, and the third lens has a negative refracting power. The optical lens satisfies a condition of $0.5EFL<EFL_G<2EFL$, where EFL is an effective focal length of the optical lens, and $EFL_G$ is an effective focal length of the at least one glass lens. The optical lens is adapted for receiving an image beam from the light incidence side, and the image beam forms a stop on the light-emitting side after passing through the optical lens. A display device is also proposed.

20 Claims, 20 Drawing Sheets

(51) Int. Cl.
*G06F 1/16* (2006.01)
*H04N 13/332* (2018.01)
*F21V 8/00* (2006.01)

(58) Field of Classification Search
CPC .......... G02B 1/00; G02B 1/041; G02B 13/18; G02B 27/0172; G06F 1/163; H04N 13/332
See application file for complete search history.

(56) References Cited

U.S. PATENT DOCUMENTS

| | | | |
|---|---|---|---|
| 2017/0343772 A1 | 11/2017 | Sun | |
| 2020/0110250 A1 | 4/2020 | Hua et al. | |
| 2020/0409037 A1 | 12/2020 | Kuo et al. | |

FOREIGN PATENT DOCUMENTS

| | | | |
|---|---|---|---|
| CN | 105892005 | 8/2016 | |
| CN | 106019570 | 10/2016 | |
| CN | 107436474 | 12/2017 | |
| CN | 109581637 | 4/2019 | |
| CN | 110261994 | 9/2019 | |
| CN | 108267834 B * | 11/2020 | ............. G03B 21/14 |
| CN | 112147758 | 12/2020 | |
| CN | 112147782 | 12/2020 | |
| CN | 112305709 | 2/2021 | |
| JP | H02184809 A | 7/1990 | |
| JP | H04298709 | 10/1992 | |
| JP | H05224120 A | 9/1993 | |
| JP | H0954259 A | 2/1997 | |
| JP | 2009192886 | 8/2009 | |
| JP | 2009192886 A * | 8/2009 | ..... G02B 15/144113 |
| JP | 2011209564 A | 10/2011 | |
| JP | 2021005084 A | 1/2021 | |
| TW | 201317618 | 5/2013 | |
| TW | 201908800 | 3/2019 | |
| TW | 202034012 | 9/2020 | |
| TW | 202117391 | 5/2021 | |
| WO | 2019054359 A1 | 3/2019 | |

OTHER PUBLICATIONS

"Office Action of Europe Counterpart Application", issued on Jul. 16, 2025, p. 1-p. 5.
"Office Action of China Counterpart Application", issued on Aug. 14, 2025, p. 1-p. 13.
"Office Action of Taiwan Counterpart Application", issued on Jul. 22, 2022, p. 1-p. 10.
"Office Action of China Counterpart Application", issued on Sep. 12, 2024, p. 1-p. 8.
Office Action of Japan counterpart application, issued on Nov. 11, 2025, p. 1-p. 6.

* cited by examiner

OPTICAL LENS AND DISPLAY DEVICE

CROSS-REFERENCE TO RELATED APPLICATION

This application claims the priority benefit of China application serial no. 202110599987.3, filed on May 31, 2021. The entirety of the above-mentioned patent application is hereby incorporated by reference herein and made a part of this specification.

BACKGROUND

Technical Field

The present invention relates to an optical element and a device having the optical element, and in particular to an optical lens and a display device.

Description of Related Art

With the development of multimedia applications such as stereoscopic display and virtual reality, a demand for high-resolution display devices is increasing.

The display device with a waveguide may dispose with the image source which has a self-luminous (transmissive) panel architecture or a reflective panel architecture. An image beam generated by the image source (panel) forms a virtual image through an optical lens, and the virtual image is further displayed at a preset position in front of a user's eyes. When an optical lens is used in a waveguide display device, the dimensions, weight, resolution, and thermal drift are important issues to take into account in the design thereof.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an optical lens and a display device which are lightweight and thin, high-resolution, and have less thermal drift.

According to an embodiment of the invention, an optical lens including a first lens, a second lens, a third lens, a fourth lens, and a fifth lens with refracting power in order from a light incidence side to a light-emitting side along an optical axis is provided. The first lens has a positive refracting power, the second lens has a positive refracting power, the third lens has a negative refracting power, and a material of at least one of the first lens, the second lens, the third lens, the fourth lens, and the fifth lens is glass. The optical lens satisfies a condition of $0.5EFL<EFL_G<2EFL$, where EFL is an effective focal length of the optical lens, and $EFL_G$ is an effective focal length of all glass lenses in the first lens to the fifth lens. The optical lens is adapted for receiving an image beam from the light incidence side. The image beam forms a stop on the light-emitting side after passing through the optical lens, such that the stop is formed at a position where the image beam has a minimum cross-sectional area.

According to another embodiment of the invention, a display device including the optical lens, an image generator, and a wave guide element is provided. The image generator is disposed on the light incidence side of the optical lens to provide an image beam. The wave guide element is disposed on the light-emitting side of the optical lens and has a light coupling inlet and a light coupling exit. The image beam from the optical lens enters the wave guide element via the light coupling inlet, and the wave guide element guides the image beam so that the image beam leaves the wave guide element via the light coupling exit.

Based on the above, the optical lens provided by an embodiment of the invention includes a glass lens and a plastic lens, and satisfies the condition of $0.5EFL<EFL_G<2EFL$, where EFL is the effective focal length of the optical lens, and $EFL_G$ is the effective focal length of all glass lenses. The optical lens may resolve images with a spatial resolution of 116 lp/mm and has a small thermal drift. The display device provided by an embodiment of the present invention has good optical performance.

To further describe the above features and advantages of the invention, embodiments accompanied with drawings are described below in details.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1:
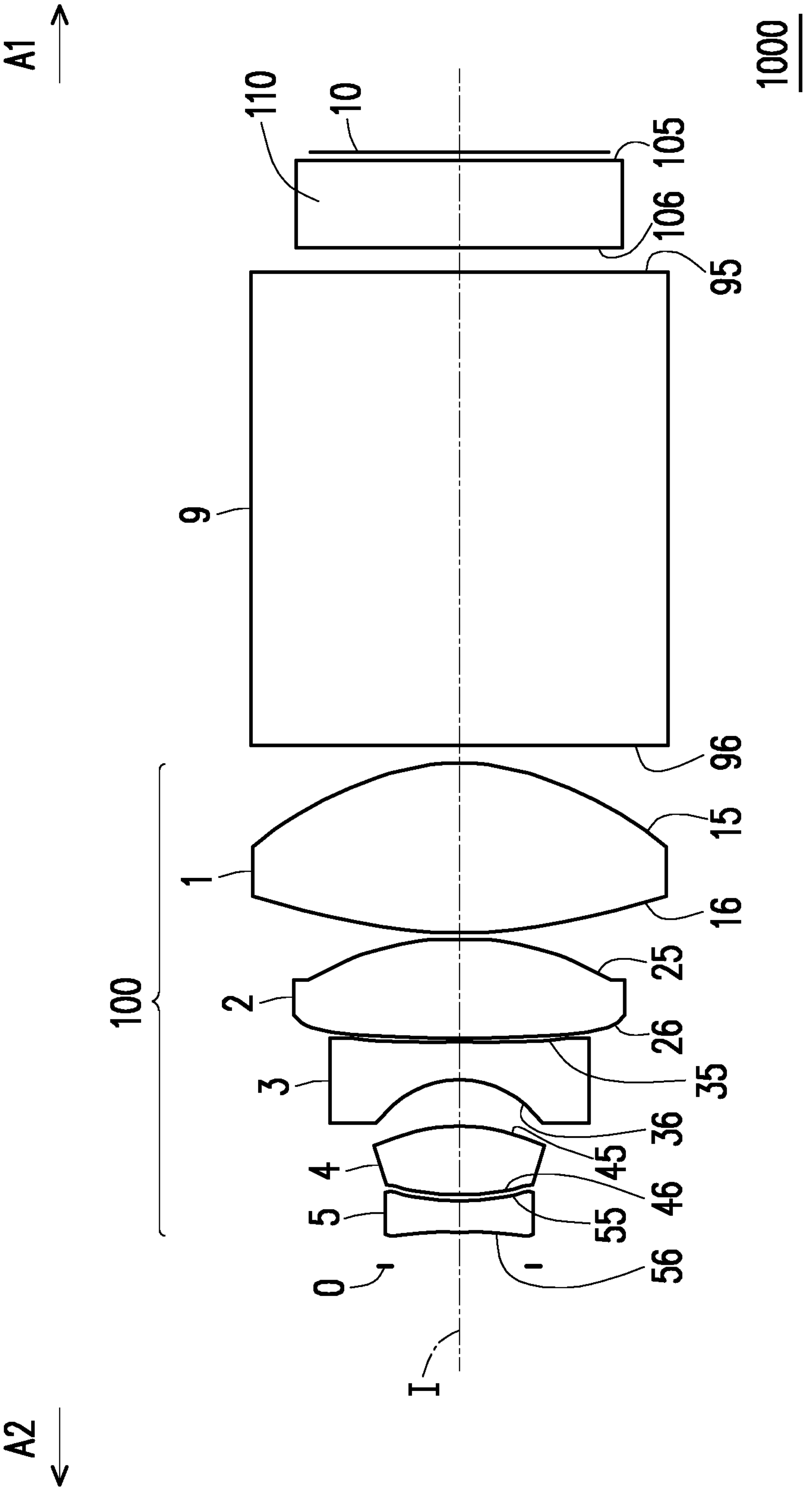
FIG. 1 is a schematic diagram of an image projection module according to the first embodiment of the invention.

FIG. 1 is a schematic diagram of an image projection module according to the first embodiment of the invention. FIGS. 2A to 2D are diagrams of lateral chromatic aberration, field curvature, and distortion of an optical lens according to the first embodiment.

Referring to FIG. 1, an image projection module 1000 includes an optical lens 100, a prism 9, and an image source 10. The image source 10 includes an image generator which would describe later. The image source 10 is configured to provide an image beam (not shown). The optical lens 100 includes a first lens 1, a second lens 2, a third lens 3, a fourth lens 4, a fifth lens 5 with refracting power in order from a light incidence side A1 to a light-emitting side A2 along an optical axis I. The first lens 1 is a glass aspheric lens. The second lens 2 is a plastic aspheric lens. The third lens 3 is a plastic aspheric lens. The fourth lens 4 is a plastic aspheric lens. The fifth lens 5 is a plastic aspheric lens. In this embodiment, an effective focal length EFL of the optical lens 100 is 7.38 millimeters (mm), and an effective focal length $EFL_{G1}$ of the first lens 1 is 7.02 mm. The optical lens 100 satisfies the condition of $0.5EFL<EFL_{G1}<2EFL$. The optical lens 100 is used to receive the image beam from the light incidence side A1, and the image beam is provided by the image source 10 disposed on the light incidence side A1. The prism 9 is disposed on the transmission path of the image beam, and is located between the image source 10 and the optical lens 100. The image beam forms a stop 0 on the light-emitting side A2 after passing through the optical lens 100, such that the stop 0 is formed at the position where the image beam has the minimum cross-sectional area.

In this embodiment, the image projection module 1000 further includes a protection cover 110. The protection cover 110 is, for example, a transparent glass, and is disposed between the image source 10 and the prism 9 to protect the image source 10 by preventing dust from adhering to an imaging surface (not lebeled) of the image source 10. The first lens 1, the second lens 2, the third lens 3, the fourth lens 4 and the fifth lens 5 of the optical lens 100, the prism 9 and the protection cover 110 respectively have light incidence surfaces 15, 25, 35, 45, 55, 95, and 105 facing the light incidence side A1 that allow an image beam to pass through and light-emitting surfaces 16, 26, 36, 46, 56, 96, and 106 facing the light-emitting side A2 that allow an image beam to pass through.

The first lens 1 has a positive refracting power. The light incidence surface 15 and the light-emitting surface 16 of the first lens 1 are aspheric surfaces. The second lens 2 has a positive refracting power. The light incidence surface 25 and the light-emitting surface 26 of the second lens 2 are aspheric surfaces. The third lens 3 has a negative refracting power. The light incidence surface 35 of the third lens 3 is a spherical surface, and the light-emitting surface 36 of the third lens 3 is an aspheric surface. The fourth lens 4 has a positive refracting power. The light incidence surface 45 and the light-emitting surface 46 of the fourth lens 4 are aspheric surfaces. The fifth lens 5 has a negative refracting power. The light incidence surface 55 of the fifth lens 5 is a spherical surface, and the light-emitting surface 56 of the fifth lens 5 is an aspheric surface.

Other detailed optical data of the first embodiment is shown in Table 1 below. Regarding the optical lens 100 of the first embodiment, the effective focal length (EFL) is 7.38 mm, the field of view (FOV) is 51 degrees, and the maximum image height is 3.38 mm. It should be noted that the radius of curvature of the light incidence surface 15 shown in Table 1 refers to the radius of curvature of the light incidence surface 15 of the first lens 1 in the optical axis region, and the radius of curvature of the light-emitting surface 16 refers to the radius of curvature of the light-emitting surface 16 of the first lens 1 in the optical axis region, and so on. The distance (0.44 mm as shown in Table 1) of the light incidence surface 15 refers to the distance between the light incidence surface 15 and a next surface (the light-emitting surface 96 of the prism 9 in this example) on the optical axis I; that is, the gap between the first lens 1 and the prism 9 on the optical axis I is 0.44 mm. The distance of the light-emitting surface 16 (4.02 mm as shown in Table 1) refers to the distance between the light-emitting surface 16 and the light incidence surface 15 on the optical axis I; that is, the thickness of the first lens 1 on the optical axis I is 4.02 mm, and so on.

TABLE 1

| First embodiment<br>Effective focal length = 7.38 mm; field of view = 51°; maximum image height = 3.38 mm | | | | | |
|---|---|---|---|---|---|
| Element | Surface | Radius of Curvature (mm) | Distance (mm) | Refractive index | Abbe number |
| Object | | infinite | infinite | | |
| Stop 0 | | infinite | 0.81 | | |
| Fifth lens 5 | Light-emitting surface 56 | −12.47 | 0.74 | 1.53 | 56.0 |
| | Light incidence surface 55 | 6.23 | 0.15 | | |
| Fourth lens 4 | Light-emitting surface 46 | 5.73 | 1.60 | 1.64 | 22.4 |
| | Light incidence surface 45 | −5.14 | 1.13 | | |
| Third lens 3 | Light-emitting surface 36 | −2.20 | 0.87 | 1.67 | 19.2 |
| | Light incidence surface 35 | 29.58 | 0.15 | | |
| Second lens 2 | Light-emitting surface 26 | 38.63 | 2.36 | 1.53 | 56.0 |
| | Light incidence surface 25 | −6.57 | 0.15 | | |
| First lens 1 | Light-emitting surface 16 | 11.59 | 4.02 | 1.60 | 67.7 |
| | Light incidence surface 15 | −5.74 | 0.44 | | |
| Prism 9 | Light-emitting surface 96 | infinite | 11.27 | 1.59 | 61.3 |
| | Light incidence surface 95 | infinite | 0.59 | | |
| Protection cover 110 | Surface 106 | infinite | 2.07 | 1.52 | 64.2 |
| | Surface 105 | infinite | 0.15 | | |
| Image source 10 | | infinite | 0.00 | | |

According to FIG. 1 and Table 1, the first lens 1 is a biconvex lens. The second lens 2 is a biconvex lens. The third lens 3 is a biconcave lens. The fourth lens 4 is a biconvex lens. The fifth lens 5 is a biconcave lens.

In this embodiment, the abbe number of the first lens 1 is greater than 40, the abbe number of the second lens 2 is greater than 40, the abbe number of the third lens 3 is less than 30, and the abbe number of the fifth lens 5 is greater than 50.

In this embodiment, a total of eight surfaces including the light incidence surfaces 15, 25, and 45 and the light-emitting surfaces 16, 26, 36, 46, and 56 are aspheric surfaces, and these aspheric surfaces are defined by the following formula:

$$Z(Y) = \frac{Y^2}{R} \Big/ \left(1 + \sqrt{1 - (1 + K)\frac{Y^2}{R^2}}\right) + \sum_{i=1}^{n} a_{2i} \times Y^{2i} \tag{1}$$

Y: the distance between a point on a curve on the aspheric surface and the optical axis;

Z: the depth of the aspheric surface, that is, the vertical distance between a point on the aspheric surface whose distance to the optical axis is Y, and a tangent plane tangent to the vertex on the optical axis of the aspheric surface;

R: the radius of curvature of the lens surface;

K: the cone coefficient;

a2i: the 2i-th-order aspherical coefficient.

In this embodiment, the aspherical coefficients of the above aspheric surfaces in formula (1) are shown in Table 2 below. Row number 15 in Table 2 indicates the aspherical coefficients of the light incidence surface 15 of the first lens 1, and the other rows may be deduced by analogy.

TABLE 2

| Surface | K | $a_4$ | $a_6$ | $a_8$ |
|---|---|---|---|---|
| 56 | 5.34E001 | 9.59E−003 | −2.33E−003 | 3.51E−004 |
| 46 | −3.28E000 | −4.50E−003 | 2.08E−003 | 6.52E−005 |
| 45 | 2.97E000 | −1.88E−003 | 8.02E−004 | 1.51E−004 |
| 36 | −3.77E−001 | 2.22E−003 | 1.43E−003 | −8.67E−004 |
| 26 | −7.14E001 | −1.89E−003 | 3.47E−004 | −1.69E−007 |
| 25 | −1.67E−001 | 3.84E−004 | −5.07E−005 | 8.24E−006 |
| 16 | −6.20E000 | −1.43E−005 | −1.32E−005 | 1.69E−006 |
| 15 | 0 | 9.50E−004 | 7.90E−006 | 3.92E−007 |

| Surface | $a_{10}$ | $a_{12}$ | $a_{14}$ | $a_{16}$ |
|---|---|---|---|---|
| 56 | 4.67E−004 | −2.61E−004 | 6.12E−005 | 0 |
| 46 | −8.91E−005 | 5.55E−006 | 2.01E−006 | 0 |
| 45 | 5.65E−005 | −3.81E−005 | 5.69E−006 | 0 |
| 36 | 4.32E−004 | −1.22E−004 | 1.28E−005 | 0 |
| 26 | −1.79E−006 | 4.96E−008 | 1.87E−009 | 0 |
| 25 | −4.42E−007 | 2.86E−009 | 6.46E−010 | 0 |
| 16 | −1.10E−007 | 3.56E−009 | −4.52E−011 | 0 |
| 15 | −1.64E−008 | 1.89E−009 | −7.50E−011 | 1.39E−012 |

When the ambient temperature of the first embodiment is respectively 0° C., 10° C., 20° C., 30° C. and 40° C., the values of the temperature (° C.) of the first lens 1, the second lens 2, the third lens 3, the fourth lens 4, and the fifth lens 5 of the optical lens 100 are shown in Table 3 below. Moreover, when the optical lens 100 of the first embodiment is applied in thermal equilibrium for the ambient temperature range within 0° C. to 40° C. without the focal length thereof being re-adjusted, the back focus of the optical lens has a thermal drift less than 0.01 mm corresponding to the center point of the projection image.

TABLE THREE

| Ambient temperature (° C.) | Fifth lens 5 | Fourth lens 4 | Third lens 3 | Second lens 2 | First lens 1 |
|---|---|---|---|---|---|
| 0 | 4 | 5 | 7 | 9 | 11 |
| 10 | 14 | 15 | 17 | 19 | 21 |
| 20 | 24 | 25 | 27 | 29 | 31 |
| 30 | 34 | 35 | 37 | 39 | 41 |
| 40 | 44 | 45 | 47 | 49 | 51 |

Figure 2A:
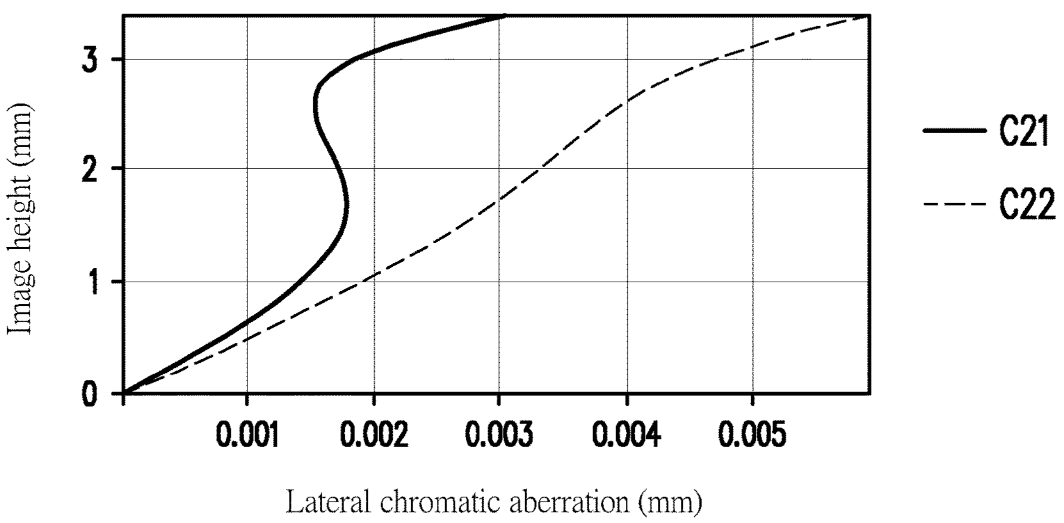
FIGS. 2A to 2D are diagrams of lateral chromatic aberration, field curvature, and distortion of an optical lens according to the first embodiment.
Figure 2B:
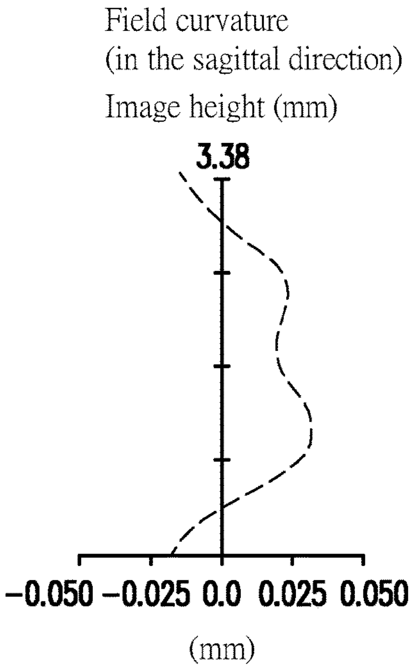
Figure 2C:
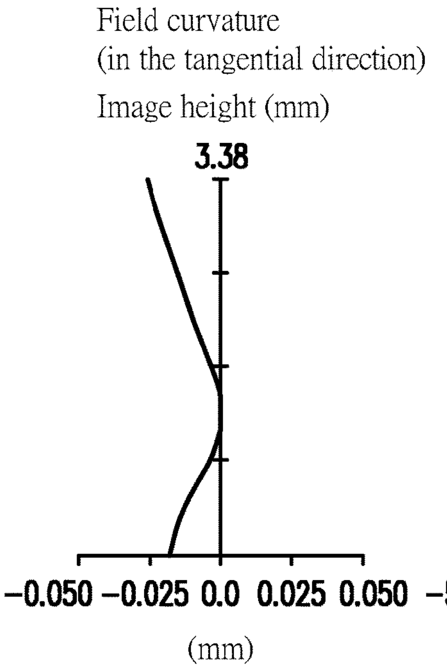
Figure 2D:
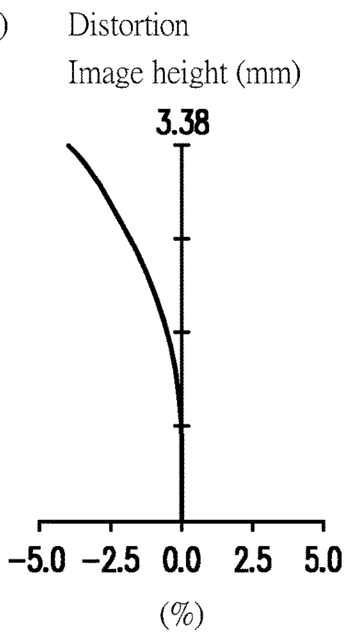

Also referring to FIGS. 2A to 2D, FIG. 2A illustrates the lateral chromatic aberration of the first embodiment, FIGS. 2B and 2C respectively illustrate the field curvature aberration in the sagittal direction and the field curvature aberration in the tangential direction of the first embodiment when the reference wavelength is 525 nanometers (nm), and FIG. 2D illustrates the distortion aberration of the first embodiment when the reference wavelength is 525 nm.

In the lateral chromatic aberration diagram of the first embodiment, that is, in FIG. 2A, the representative wavelengths are respectively 465 nm, 525 nm, and 620 nm. A curve C21 in FIG. 2A illustrates the chromatic aberration between the 465 nm wavelength and the 620 nm wavelength, and a curve C22 illustrates the chromatic aberration between the 465 nm wavelength and the 525 nm wavelength. It can be seen from FIG. 2A that the chromatic aberration between the representative wavelengths is small and the chromatic aberration of the optical lens 100 is good.

In the two field curvature aberration diagrams of FIGS. 2B and 2C, the field curvature aberrations of the three representative wavelengths within the entire field of view fall within ±0.04 mm, indicating that the optical lens 100 of the first embodiment may effectively eliminate aberration. The distortion aberration diagram of FIG. 2D shows that the aberration of the first embodiment is maintained within a range of ±4%, indicating that the aberration of the first embodiment meets the imaging quality requirements of the optical lens. Accordingly, compared with a conventional optical lens, the first embodiment may still provide good imaging quality under the conditions that the field of view is 51°, the maximum image height is 3.38 mm, and some of the lenses are plastic lenses. The optical lens 100 of the first embodiment may resolve images with a spatial resolution of 116 lp/mm.

In order to fully explain various implementation aspects of the invention, other embodiments of the invention will be described below. It must be noted that the following embodiments use the element labels and part of the content of the aforementioned embodiment, and same labels are used to represent same or similar elements, and the description of the same technical content will be omitted. The aforementioned embodiment may be referred to for the description of the omitted parts, and the description will not be repeated in the following embodiments.

Figure 3:
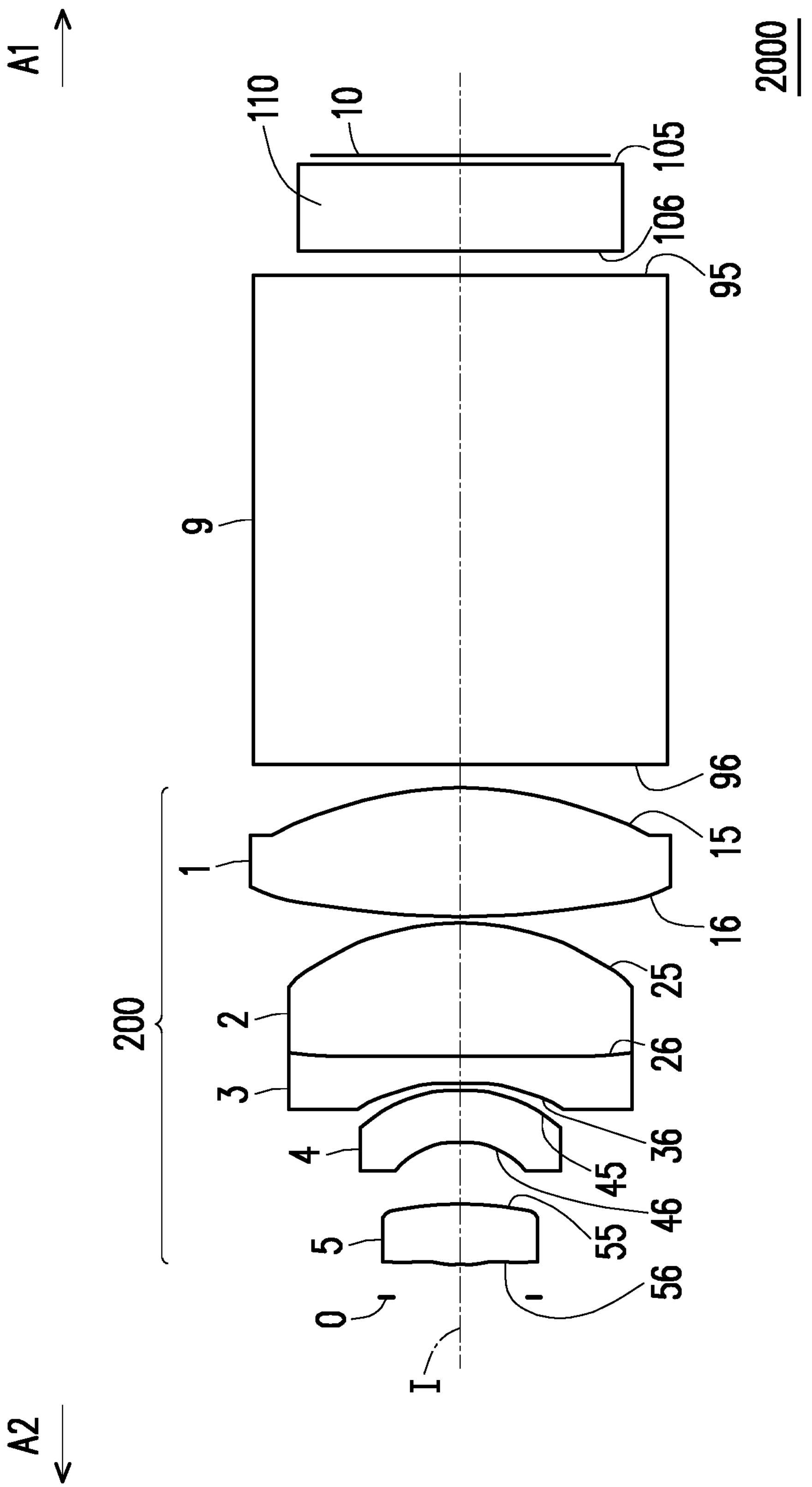
FIG. 3 is a schematic diagram of an image projection module according to the second embodiment of the invention.

FIG. 3 is a schematic diagram of an image projection module according to the second embodiment of the invention. FIGS. 4A to 4D are diagrams of lateral chromatic aberration, field curvature, and distortion of an optical lens according to the second embodiment.

Referring to FIG. 3, an image projection module 2000 includes an optical lens 200, a prism 9, and an image source 10. The optical lens 200 includes the first lens 1, the second lens 2, the third lens 3, the fourth lens 4, and the fifth lens 5 with refracting power in order from the light incidence side A1 to the light-emitting side A2 along the optical axis I. The first lens 1 is a glass aspheric lens. The second lens 2 is a glass spherical lens. The third lens 3 is a glass spherical lens. The fourth lens 4 is a plastic aspheric lens. The fifth lens 5 is a plastic aspheric lens. In this embodiment, the effective focal length EFL of the optical lens 200 is 7.76 mm, and an overall effective focal length $EFL_{G1-3}$ of the first lens 1, the second lens 2 and the third lens 3 is 7.68 mm. The optical lens 200 satisfies the condition of $0.5EFL<EFL_{G1-3}<2EFL$. The optical lens 200 is used to receive an image beam from the light incidence side A1, and the image beam is provided by the image source 10. The prism 9 is disposed on the transmission path of the image beam, and is located between the image source 10 and the optical lens 200. The image beam forms the stop 0 on the light-emitting side A2 after passing through the optical lens 100, such that the stop 0 is formed at the position where the image beam has the minimum cross-sectional area.

The image projection module 2000 further includes the protection cover 110. The protection cover 110 is, for example, a transparent glass, and is disposed between the image source 10 and the prism 9 to protect the image source 10 by preventing dust from adhering to the imaging surface of the image source 10. The first lens 1 has a positive refracting power. The light incidence surface 15 and the light-emitting surface 16 of the first lens 1 are aspheric surfaces. The second lens 2 and the third lens 3 are combined into a cemented lens, and the second lens 2 has a positive refracting power. The light incidence surface 25 and the light-emitting surface 26 of the second lens 2 are spherical surfaces. The third lens 3 has a negative refracting power. The light-emitting surface 36 of the third lens 3 is a spherical surface. The fourth lens 4 has a negative refracting power. The light incidence surface 45 and the light-emitting surface 46 of the fourth lens 4 are aspheric surfaces. The fifth lens 5 has a positive refracting power. The light incidence surface 55 and the light-emitting surface 56 of the fifth lens 5 are aspheric surfaces.

Other detailed optical data of the second embodiment is shown in Table 4 below, and the effective focal length of the optical lens 200 of the second embodiment is 7.76 mm, the field of view is 48°, and the maximum image height is 3.38 mm.

TABLE 4

| Second embodiment<br>Effective focal length = 7.76 mm; field of view = 48°; maximum image height = 3.38 mm | | | | | |
|---|---|---|---|---|---|
| Element | Surface | Radius of Curvature (mm) | Distance (mm) | Refractive index | Abbe number |
| Object | | Infinite | Infinite | | |
| Stop 0 | | Infinite | 0.73 | | |
| Fifth lens 5 | Light-emitting surface 56 | 88.18 | 1.37 | 1.67 | 19.2 |
| | Light incidence surface 55 | −9.23 | 1.51 | | |
| Fourth lens 4 | Light-emitting surface 46 | −1.95 | 1.21 | 1.53 | 56.0 |
| | Light incidence surface 45 | −3.42 | 0.15 | | |
| Third lens 3 | Light-emitting surface 36 | −5.61 | 0.73 | 1.92 | 18.9 |
| Second lens 2 | Light-emitting surface 26 | 191.46 | 3.07 | 1.77 | 49.6 |
| | Light incidence surface 25 | −6.43 | 0.15 | | |
| First lens 1 | Light-emitting surface 16 | 19.09 | 3.04 | 1.62 | 63.9 |
| | Light incidence surface 15 | −8.83 | 0.59 | | |
| Prism 9 | Light-emitting surface 96 | Infinite | 11.56 | 1.59 | 61.3 |
| | Light incidence surface 95 | Infinite | 0.59 | | |
| Protection cover 110 | Surface 106 | Infinite | 2.07 | 1.52 | 64.2 |
| | Surface 105 | Infinite | 0.15 | | |
| Image source 10 | | Infinite | 0 | | |

According to FIG. 3 and Table 4, the first lens 1 is a biconvex lens. The cemented lens formed by the second lens 2 and the third lens 3 is a convex-concave lens with a convex surface facing the light incidence side A1. The fourth lens 4 is a convex-concave lens with a convex surface facing the light incidence side A1. The fifth lens 5 is a biconvex lens.

In this embodiment, the abbe number of the first lens 1 is greater than 40, the abbe number of the second lens 2 is greater than 40, and the abbe number of the third lens 3 is less than 30.

In this embodiment, a total of six surfaces including the light incidence surfaces 15, 45, and 55 and the light-emitting surfaces 16, 46, and 56 are all aspheric surfaces. The aspherical coefficients of the above aspheric surfaces in formula (1) are shown in Table 5 below.

TABLE 5

| Surface | K | $a_4$ | $a_6$ | $a_8$ |
|---|---|---|---|---|
| 56 | 0 | 2.38E−003 | 1.16E−004 | −6.18E−004 |
| 55 | 0 | 2.01E−003 | −1.19E−003 | −2.79E−004 |
| 46 | −2.71E−001 | 2.18E−002 | −6.54E−003 | −1.07E−004 |
| 45 | −5.95E000 | −4.74E−003 | −1.27E−004 | −5.83E−004 |
| 16 | 1.29E001 | 6.49E−004 | −1.06E−004 | 2.16E−006 |
| 15 | 0 | 6.75E−004 | −1.42E−005 | −1.80E−006 |

| Surface | $a_{10}$ | $a_{12}$ | $a_{14}$ | $a_{16}$ |
|---|---|---|---|---|
| 56 | 9.16E−005 | 1.38E−004 | −8.67E−005 | 1.44E−005 |
| 55 | 0 | 0 | 0 | 0 |
| 46 | 0 | 0 | 0 | 0 |
| 45 | 1.35E−004 | −9.08E−006 | −2.97E−007 | 5.05E−008 |
| 16 | 6.70E−009 | 2.66E−009 | −1.16E−010 | 0 |
| 15 | 9.42E−008 | 4.90E−010 | −5.75E−011 | 4.78E−013 |

When the ambient temperature of the second embodiment is respectively 0° C., 10° C., 20° C., 30° C. and 40° C., the values of the temperature (° C.) of the first lens 1, the second lens 2, the third lens 3, the fourth lens 4, and the fifth lens 5 of the optical lens 200 are shown in Table 6 below. Moreover, when the optical lens 200 of the second embodiment is applied in thermal equilibrium for the ambient temperature range within 0° C. to 40° C. without the focal length thereof being re-adjusted, the back focus of the optical lens has a thermal drift less than 0.01 mm corresponding to the center point of the projection image.

TABLE 6

| Ambient temperature (° C.) | Fifth lens 5 | Fourth lens 4 | Third lens 3 | Second lens 2 | First lens 1 |
|---|---|---|---|---|---|
| 0 | 4 | 5 | 7 | 9 | 11 |
| 10 | 14 | 15 | 17 | 19 | 21 |
| 20 | 24 | 25 | 27 | 29 | 31 |
| 30 | 34 | 35 | 37 | 39 | 41 |
| 40 | 44 | 45 | 47 | 49 | 51 |

Figure 4A:
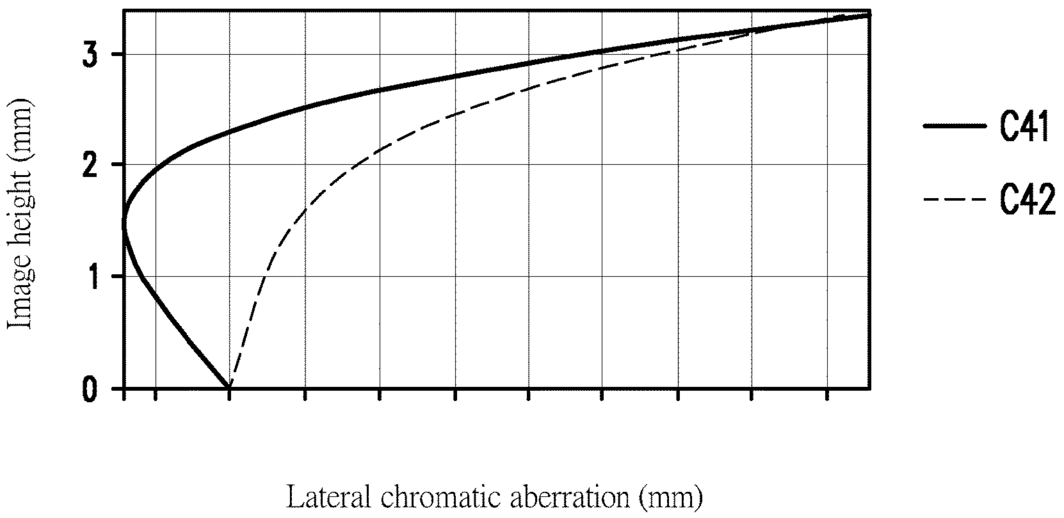
FIGS. 4A to 4D are diagrams of lateral chromatic aberration, field curvature, and distortion of an optical lens according to the second embodiment.
Figure 4B:
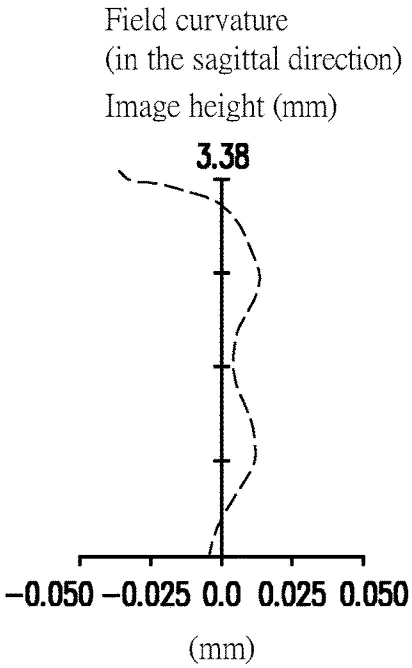
Figure 4C:
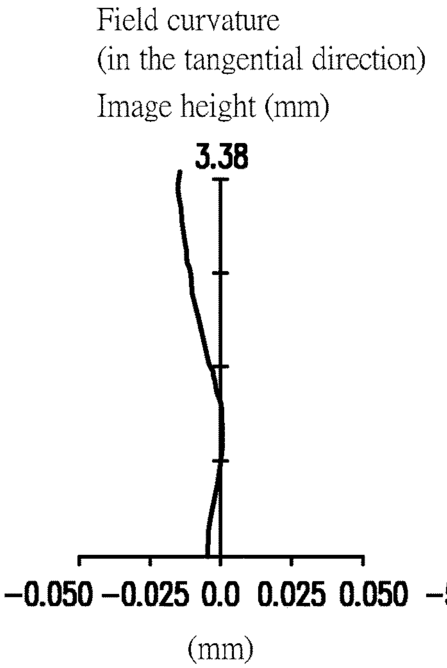
Figure 4D:
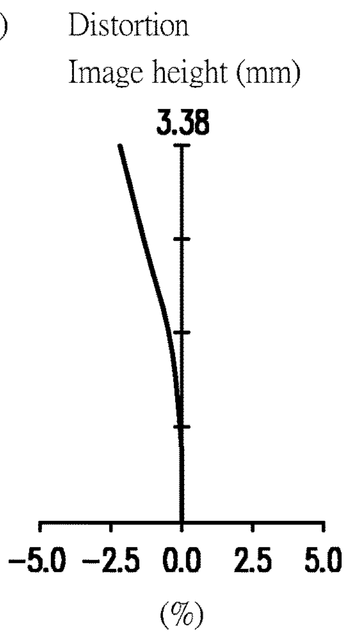

Also referring to FIGS. 4A to 4D, FIG. 4A illustrates the lateral chromatic aberration of the second embodiment, FIGS. 4B and 4C respectively illustrate the field curvature aberration in the sagittal direction and the field curvature aberration in the tangential direction of the second embodiment when the reference wavelength is 525 nm, and FIG. 4D illustrates the distortion aberration of the second embodiment when the reference wavelength is 525 nm.

In the lateral chromatic aberration diagram of the second embodiment, that is, in FIG. 4A, the representative wavelengths are respectively 465 nm, 525 nm, and 620 nm. A curve C41 in FIG. 4A illustrates the chromatic aberration between the 465 nm wavelength and the 620 nm wavelength, and a curve C42 illustrates the chromatic aberration between the 465 nm wavelength and the 525 nm wavelength. It can be seen from FIG. 4A that the chromatic aberration between the representative wavelengths is small and the chromatic aberration of the optical lens 200 is good.

In the two field curvature aberration diagrams of FIGS. 4B and 4C, the field curvature aberrations of the three representative wavelengths within the entire field of view fall within ±0.04 mm, indicating that the optical lens 200 of the second embodiment may effectively eliminate aberration. The distortion aberration diagram of FIG. 4D shows that the aberration of the second embodiment is maintained within a range of ±4%, indicating that the aberration of the second embodiment meets the imaging quality requirements of the optical lens. Accordingly, compared with a conventional optical lens, the second embodiment may still provide good imaging quality under the conditions that the field of view is 48°, the maximum image height is 3.38 mm, and some of the lenses are plastic lenses. The optical lens 200 of the second embodiment may resolve images with a resolution of 116 lp/mm space.

Figure 5:
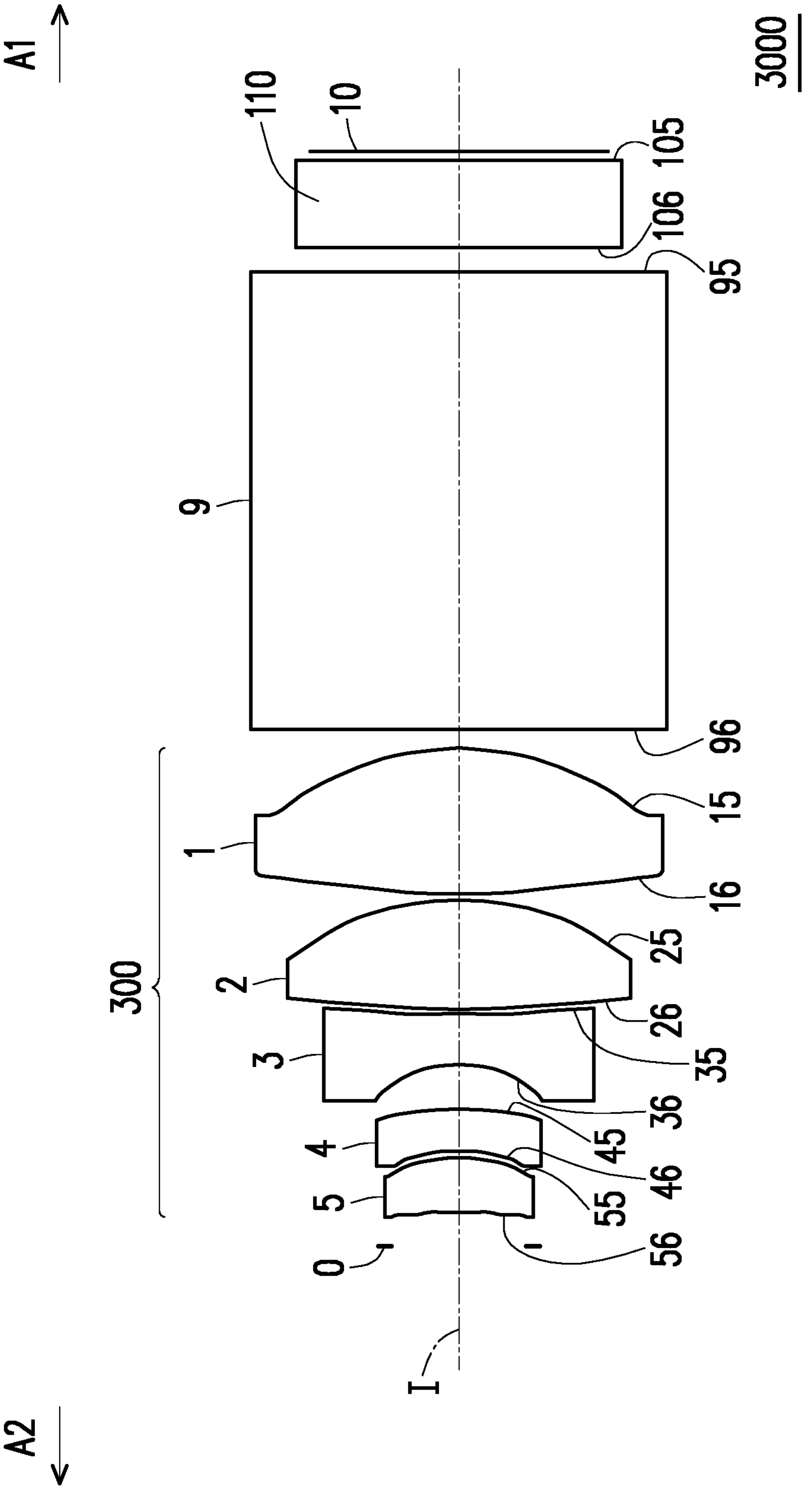
FIG. 5 is a schematic diagram of an image projection module according to the third embodiment of the invention.

FIG. 5 is a schematic diagram of an image projection module according to the third embodiment of the invention. FIGS. 6A to 6D are diagrams of lateral chromatic aberration, field curvature, and distortion of an optical lens according to the third embodiment.

Referring to FIG. 5, an image projection module 3000 includes an optical lens 300, the prism 9 and the image source 10. The optical lens 300 includes the first lens 1, the second lens 2, the third lens 3, the fourth lens 4, and the fifth lens 5 with refracting power in order from the light incidence side A1 to the light-emitting side A2 along the optical axis I. The first lens 1 is a plastic aspheric lens. The second lens 2 is a glass aspheric lens. The third lens 3 is a plastic aspheric lens. The fourth lens 4 is a plastic aspheric lens. The fifth lens 5 is a plastic aspheric lens. In this embodiment, the effective focal length EFL of the optical lens 300 is 7.31 mm, and an effective focal length $EFL_{G2}$ of the second lens 2 is 7.2 mm. The optical lens 300 satisfies the condition of $0.5EFL<EFL_{G2}<2EFL$. The optical lens 300 is used to receive an image beam from the light incidence side A1, and the image beam is provided by the image source 10.

The prism 9 is disposed on the path of the image beam, and is disposed between the image source 10 and the optical lens 300. The image beam forms the stop 0 on the light-emitting side A2 after passing through the optical lens 300, such that the stop 0 is formed at the position where the image beam has the minimum cross-sectional area.

The image projection module 3000 further includes the protection cover 110. The protection cover 110 is, for example, a transparent glass, and is disposed between the image source 10 and the prism 9 to protect the image source 10 by preventing dust from adhering to the imaging surface of the image source 10. The first lens 1 has a positive refracting power. The light incidence surface 15 and the light-emitting surface 16 of the first lens 1 are aspheric surfaces. The second lens 2 has a positive refracting power. The light incidence surface 25 and the light-emitting surface 26 of the second lens 2 are aspheric surfaces. The third lens 3 has a negative refracting power. The light incidence surface 35 and the light-emitting surface 36 of the third lens 3 are aspheric surfaces. The fourth lens 4 has a negative refracting power. The light incidence surface 45 and the light-emitting surface 46 of the fourth lens 4 are aspheric surfaces. The fifth lens 5 has a positive refracting power. The light incidence surface 55 and the light-emitting surface 56 of the fifth lens 5 are aspheric surfaces.

Other detailed optical data of the third embodiment is shown in Table 7 below, and the effective focal length of the third embodiment optical lens 300 is 7.31 mm, the field of view is 51.4°, and the maximum image height is 3.38 mm.

TABLE 7

Third embodiment
Effective focal length = 7.31 mm; field of view = 51.4°; maximum image height = 3.38 mm

| Element | Surface | Radius of Curvature (mm) | Distance (mm) | Refractive index | Abbe number |
|---|---|---|---|---|---|
| Object | | Infinite | Infinite | | |
| Stop 0 | | Infinite | 0.82 | | |
| Fifth lens 5 | Light-emitting surface 56 | −13.47 | 1.35 | 1.67 | 19.2 |
| | Light incidence surface 55 | −3.18 | 0.15 | | |
| Fourth lens 4 | Light-emitting surface 46 | −3.23 | 1.05 | 1.53 | 56.0 |
| | Light incidence surface 45 | −8.64 | 1.10 | | |
| Third lens 3 | Light-emitting surface 36 | −2.69 | 1.20 | 1.67 | 19.2 |
| | Light incidence surface 35 | 16.77 | 0.15 | | |
| Second lens 2 | Light-emitting surface 26 | 25.35 | 2.68 | 1.73 | 54.7 |
| | Light incidence surface 25 | −6.38 | 0.15 | | |
| First lens 1 | Light-emitting surface 16 | 13.92 | 3.56 | 1.53 | 56.0 |
| | Light incidence surface 15 | −6.48 | 0.44 | | |
| Prism 9 | Light-emitting surface 96 | Infinite | 11.26 | 1.59 | 61.3 |
| | Light incidence surface 95 | Infinite | 0.58 | | |
| Protection cover 110 | Surface 106 | Infinite | 2.07 | 1.52 | 64.2 |
| | Surface 105 | Infinite | 0.15 | | |
| Image source 10 | | Infinite | 0 | | |

According to FIG. 5 and Table 7, the first lens 1 is a biconvex lens. The second lens 2 is a biconvex lens. The third lens 3 is a biconcave lens. The fourth lens 4 is a convex-concave lens with a convex surface facing the light incidence side A1. The fifth lens 5 is a concave-convex lens with a convex surface facing the light incidence side A1.

In this embodiment, the abbe number of the first lens 1 is greater than 40, the abbe number of the second lens 2 is greater than 40, and the abbe number of the third lens 3 is less than 30. The abbe number of the fourth lens 4 is greater than 50.

In this embodiment, a total of ten surfaces including the light incidence surfaces 15, 25, 35, 45, and 55 and the light-emitting surfaces 16, 26, 36, 46, and 56 are all aspheric surfaces. The aspherical coefficients of the above aspheric surfaces in formula (1) are shown in Table 8 below.

TABLE 8

| Surface | K | $a_4$ | $a_6$ | $a_8$ |
|---|---|---|---|---|
| 56 | 5.25E001 | 5.58E−003 | −1.62E−004 | −1.03E−004 |
| 55 | 0 | 1.67E−002 | −3.87E−003 | 4.10E−005 |
| 46 | −2.17E000 | 5.11E−003 | −3.22E−003 | 2.39E−004 |
| 45 | 6.76E000 | −8.25E−003 | 3.42E−003 | −7.68E−004 |
| 36 | 1.06E−001 | −1.22E−003 | 1.44E−003 | −1.31E−004 |
| 35 | −6.59E001 | −5.54E−004 | −7.49E−006 | 5.16E−006 |

TABLE 8-continued

| | | | | |
|---|---|---|---|---|
| 26 | 6.15E000 | −9.05E−004 | 4.34E−005 | −4.62E−008 |
| 25 | 2.17E−002 | 8.77E−005 | −1.90E−005 | 1.56E−006 |
| 16 | 4.93E000 | −9.96E−004 | −4.97E−005 | 2.99E−006 |
| 15 | 0 | 4.69E−004 | −1.06E−005 | −7.11E−008 |
| Surface | $a_{10}$ | $a_{12}$ | $a_{14}$ | $a_{16}$ |
| 56 | 2.64E−005 | −2.07E−005 | 5.40E−006 | X |
| 55 | X | X | X | X |
| 46 | X | X | X | X |
| 45 | 2.37E−004 | −2.78E−005 | −1.69E−006 | 3.09E−007 |
| 36 | −1.33E−005 | 2.07E−005 | −3.61E−006 | X |
| 35 | −1.03E−007 | −5.72E−008 | 3.34E−009 | X |
| 26 | −9.16E−008 | −3.69E−010 | 2.57E−010 | X |
| 25 | −1.64E−008 | 3.26E−009 | −1.54E−010 | X |
| 16 | −7.95E−008 | 2.25E−009 | −3.37E−011 | X |
| 15 | 8.38E−009 | 1.94E−009 | −1.05E−010 | 2.43E−012 |

When the ambient temperature of the third embodiment is respectively 0° C., 10° C., 20° C., 30° C., and 40° C., the values of the temperature (° C.) of the first lens 1, the second lens 2, the third lens 3, the fourth lens 4, and the fifth lens 5 of the optical lens 300 is shown in Table 9 below. Moreover, when the optical lens 300 of the third embodiment is applied in thermal equilibrium for the ambient temperature range within 0° C. to 40° C. without the focal length thereof being re-adjusted, the back focus of the optical lens has a thermal drift less than 0.015 mm corresponding to the center point of the projection image.

TABLE 9

| Ambient temperature (° C.) | Fifth lens 5 | Fourth lens 4 | Third lens 3 | Second lens 2 | First lens 1 |
|---|---|---|---|---|---|
| 0 | 4 | 5 | 7 | 9 | 11 |
| 10 | 14 | 15 | 17 | 19 | 21 |
| 20 | 24 | 25 | 27 | 29 | 31 |
| 30 | 34 | 35 | 37 | 39 | 41 |
| 40 | 44 | 45 | 47 | 49 | 51 |

Figure 6A:
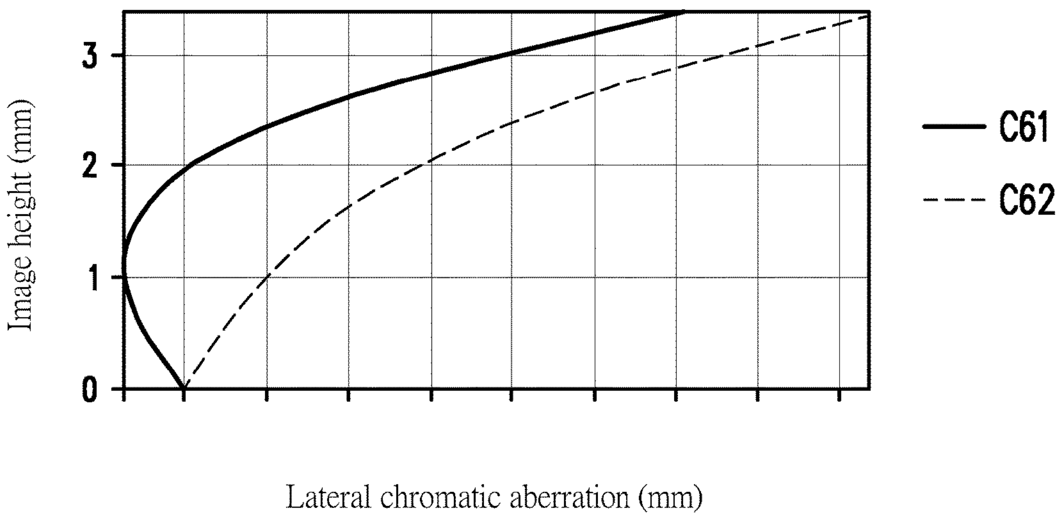
FIGS. 6A to 6D are diagrams of lateral chromatic aberration, field curvature, and distortion of an optical lens according to the third embodiment.
Figure 6B:
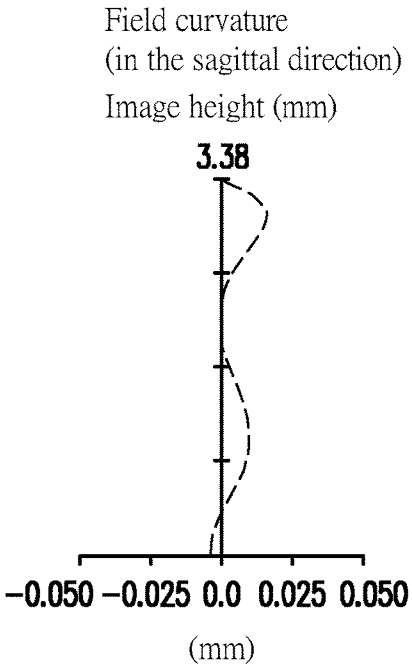
Figure 6C:
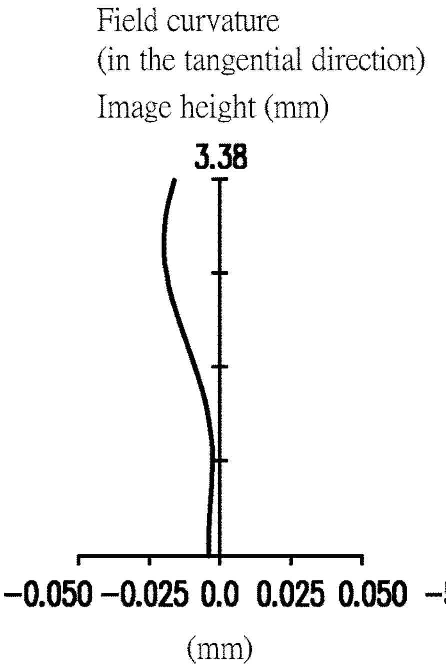
Figure 6D:
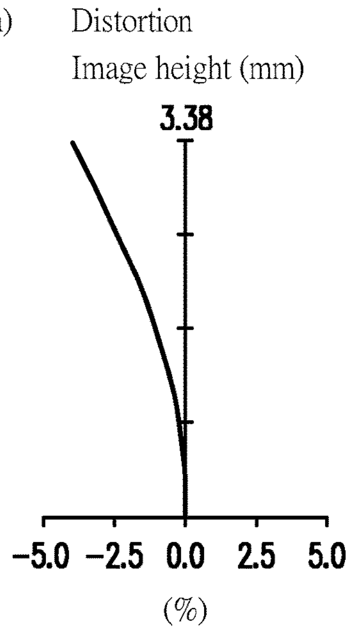

Also referring to FIGS. 6A to 6D, FIG. 6A illustrates the lateral chromatic aberration of the third embodiment, FIGS. 6B and 6C respectively illustrate the field curvature aberration in the sagittal direction and the field curvature aberration in tangential direction of the third embodiment when the reference wavelength is 525 nm, and FIG. 6D illustrates the distortion aberration of the third embodiment when the reference wavelength is 525 nm.

In the lateral chromatic aberration diagram of the third embodiment, that is, in FIG. 6A, the representative wavelengths are respectively 465 nm, 525 nm, and 620 nm. A curve C61 in FIG. 6A illustrates the chromatic aberration between the 465 nm wavelength and the 620 nm wavelength, and a curve C62 illustrates the chromatic aberration between the 465 nm wavelength and the 525 nm wavelength. It can be seen from FIG. 6A that the chromatic aberration between the representative wavelengths is small and the chromatic aberration of the optical lens 300 is good.

In the two field curvature aberration diagrams of FIGS. 6B and 6C, the field curvature aberrations of the three representative wavelengths within the entire field of view fall within ±0.02 mm, indicating that the optical lens 300 of the third embodiment may effectively eliminate aberration. The distortion aberration diagram of FIG. 6D shows that the aberration of the third embodiment is maintained within a range of ±4%, indicating that the aberration of the third embodiment meets the imaging quality requirements of the optical lens. Accordingly, compared with a conventional optical lens, the third embodiment may still provide good imaging quality under the conditions that the field of view is 51.4°, the maximum image height is 3.38 mm, and some of the lenses are plastic lenses. The optical lens 300 of the third embodiment may resolve images with a resolution of 116 lp/mm space.

Figure 7:
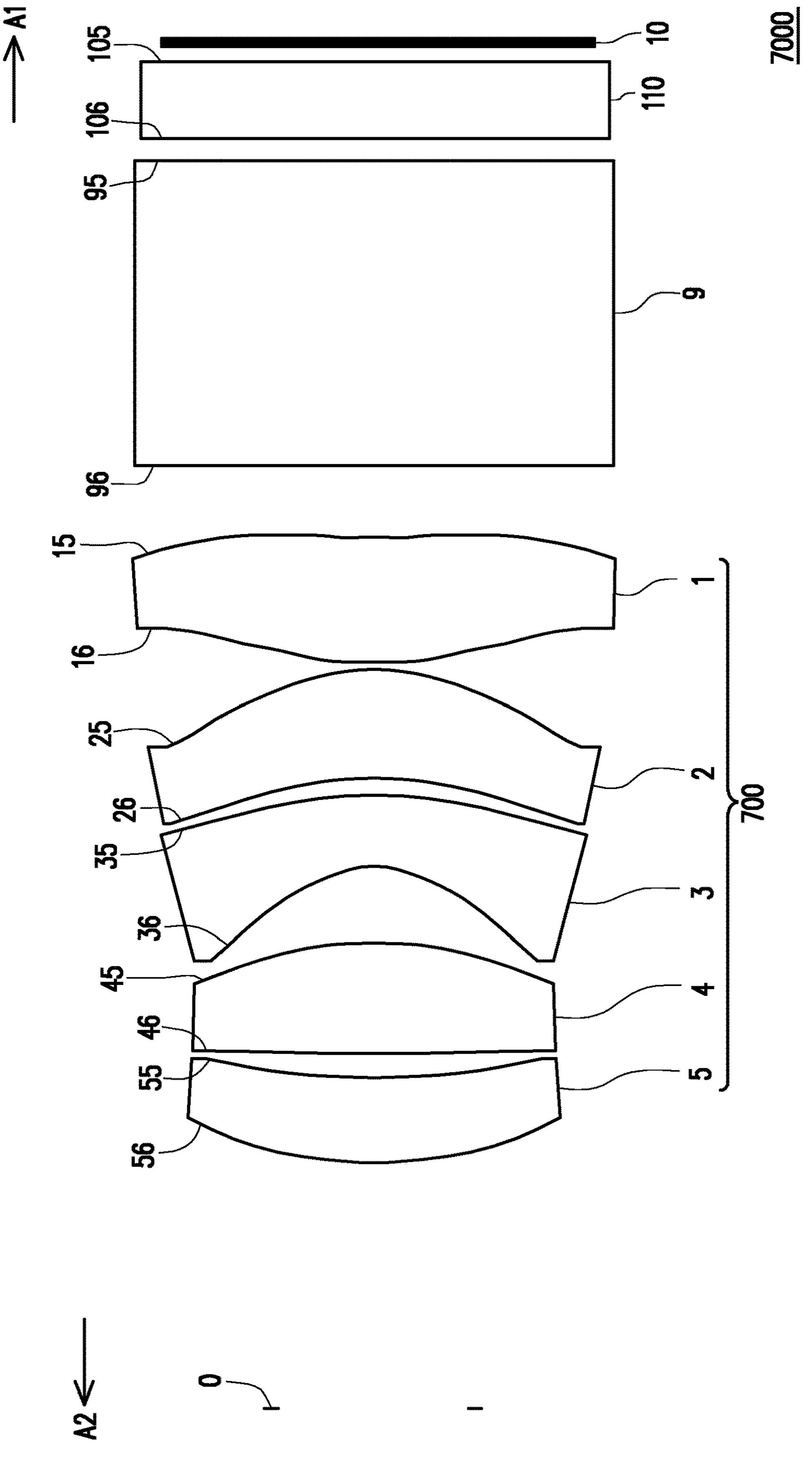
FIG. 7 is a schematic diagram of an image projection module according to the fourth embodiment of the invention.

FIG. 7 is a schematic diagram of an image projection module according to the fourth embodiment of the invention. The optical lens 700 includes the first lens 1, the second lens 2, the third lens 3, the fourth lens 4, and the fifth lens 5 with refracting power in order from the light incidence side A1 to the light-emitting side A2 along the optical axis I. The first lens 1, the second lens 2, the third lens 3 and the fifth lens 5 are plastic aspheric lenses. The fourth lens 4 is a glass aspheric lens. In this embodiment, the effective focal length EFL of the optical lens 700 is 7.57 mm, and an effective focal length $EFL_{G4}$ of the fourth lens 4 is 5.89 mm. The optical lens 700 satisfies the condition of $0.5EFL<EFL_{G4}<2EFL$. The optical lens 700 is used to receive an image beam from the light incidence side A1, and the image beam is provided by the image source 10. The prism 9 is disposed on the path of the image beam, and is disposed between the image source 10 and the optical lens 700. The image beam forms the stop 0 on the light-emitting side A2 after passing through the optical lens 700, such that the stop 0 is formed at the position where the image beam has the minimum cross-sectional area.

The image projection module 7000 further includes the protection cover 110. The protection cover 110 is, for example, a transparent glass, and is disposed between the image source 10 and the prism 9 to protect the image source 10 by preventing dust from adhering to the imaging surface of the image source 10. The first lens 1 has a positive refracting power. The light incidence surface 15 and the light-emitting surface 16 of the first lens 1 are aspheric surfaces. The second lens 2 has a positive refracting power. The light incidence surface 25 and the light-emitting surface 26 of the second lens 2 are aspheric surfaces. The third lens 3 has a negative refracting power. The light incidence surface 35 and the light-emitting surface 36 of the third lens 3 are aspheric surfaces. The fourth lens 4 has a positive refracting power. The light incidence surface 45 and the light-emitting surface 46 of the fourth lens 4 are aspheric surfaces. The fifth lens 5 has a positive refracting power. The light incidence surface 55 and the light-emitting surface 56 of the fifth lens 5 are aspheric surfaces.

Other detailed optical data of the fourth embodiment is shown in Table 10 below, and the effective focal length of the third embodiment optical lens 700 is 7.57 mm.

TABLE 10

| Fourth embodiment | | | | | |
|---|---|---|---|---|---|
| Element | Surface | Radius of Curvature (mm) | Distance (mm) | Refractive index | Abbe number |
| Object | | Infinite | Infinite | | |
| Stop 0 | | Infinite | 3.23 | | |
| Fifth lens 5 | Light-emitting surface 56 | 5.71 | 1.12 | 1.64 | 22.4 |
| | Light incidence surface 55 | 10.17 | 0.29 | | |
| Fourth lens 4 | Light-emitting surface 46 | 28.45 | 1.46 | 1.76 | 45.6 |
| | Light incidence surface 45 | −5.21 | 0.98 | | |
| Third lens 3 | Light-emitting surface 36 | −1.46 | 0.95 | 1.66 | 20.4 |
| | Light incidence surface 35 | −4.95 | 0.22 | | |
| Second lens 2 | Light-emitting surface 26 | −4.54 | 1.41 | 1.54 | 56 |
| | Light incidence surface 25 | −3.20 | 0.10 | | |
| First lens 1 | Light-emitting surface 16 | 4.15 | 1.65 | 1.54 | 56 |
| | Light incidence surface 15 | 20.85 | 0.93 | | |
| Prism 9 | Light-emitting surface 96 | Infinite | 4.00 | 1.52 | 64.2 |
| | Light incidence surface 95 | Infinite | 0.30 | | |
| Protection cover 110 | Surface 106 | Infinite | 1.00 | 1.52 | 64.2 |
| | Surface 105 | Infinite | 0.01 | | |
| Image source 10 | | Infinite | 0 | | |

According to FIG. 7 and Table 10, the abbe number of the first lens 1 is greater than 40, the abbe number of the second lens 2 is greater than 40, and the abbe number of the third lens 3 is less than 30.

In this embodiment, a total of ten surfaces including the light incidence surfaces 15, 25, 35, 45, and 55 and the light-emitting surfaces 16, 26, 36, 46, and 56 are all aspheric surfaces. The aspherical coefficients of the above aspheric surfaces in formula (1) are shown in Table 11 below.

TABLE 11

| Surface | K | $a_4$ | $a_6$ | $a_8$ |
|---|---|---|---|---|
| 56 | 0 | 1.65E−05 | 6.41E−05 | 4.19E−05 |
| 55 | 0 | −4.89E−04 | 5.54E−05 | −5.61E−05 |
| 46 | 0 | −1.29E−03 | 5.01E−04 | −1.51E−04 |
| 45 | 0 | 1.42E−05 | −2.45E−04 | 9.95E−04 |
| 36 | −3.31E+00 | −6.28E−02 | 3.78E−02 | −1.58E−02 |
| 35 | 2.54E−01 | 5.04E−03 | 1.71E−03 | −5.24E−04 |
| 26 | 0 | 5.64E−03 | −4.09E−04 | 2.26E−04 |
| 25 | 0 | 1.46E−03 | 1.82E−03 | −2.38E−04 |
| 16 | −8.93E+00 | −1.79E−03 | 9.72E−05 | −8.34E−05 |
| 15 | 0 | −9.34E−03 | 7.85E−04 | −7.42E−05 |

| Surface | $a_{10}$ | $a_{12}$ | $a_{14}$ | $a_{16}$ |
|---|---|---|---|---|
| 56 | −4.19E−05 | 1.47E−05 | −1.78E−06 | 6.01E−08 |
| 55 | 3.48E−05 | −1.34E−05 | 3.44E−06 | −3.25E−07 |
| 46 | −9.80E−06 | 2.11E−05 | −4.89E−06 | 3.35E−07 |
| 45 | −6.34E−04 | 1.88E−04 | −2.68E−05 | 1.46E−06 |
| 36 | 4.23E−03 | −6.66E−04 | 5.54E−05 | −1.87E−06 |
| 35 | 4.55E−05 | 4.42E−06 | −9.40E−07 | 4.00E−08 |
| 26 | −4.13E−05 | −1.15E−06 | 9.41E−07 | −6.23E−08 |
| 25 | 1.78E−05 | 1.24E−06 | −3.35E−07 | 2.09E−08 |
| 16 | 1.52E−05 | −1.23E−06 | 4.01E−08 | −2.30E−10 |
| 15 | 5.95E−06 | −2.00E−07 | −1.04E−08 | 7.25E−10 |

When the ambient temperature of the fourth embodiment is respectively 0° C., 10° C., 20° C., 30° C., 40° C., 50° C., and 60° C., the values of the temperature (° C.) of the first lens 1, the second lens 2, the third lens 3, the fourth lens 4, and the fifth lens 5 of the optical lens 700 is shown in Table 12 below. Moreover, when the optical lens 700 of the fourth embodiment is applied in thermal equilibrium for the ambient temperature range within 0° C. to 60° C. without the focal length thereof being re-adjusted, the back focus of the optical lens has a thermal drift less than 0.015 mm corresponding to the center point of the projection image.

TABLE 12

| Ambient temperature (° C.) | Fifth lens 5 | Fourth lens 4 | Third lens 3 | Second lens 2 | First lens 1 |
|---|---|---|---|---|---|
| 0 | 7 | 8 | 8 | 8 | 8 |
| 10 | 17 | 18 | 18 | 18 | 18 |
| 20 | 32 | 33 | 33 | 33 | 33 |
| 30 | 37 | 38 | 38 | 38 | 38 |
| 40 | 47 | 48 | 48 | 48 | 48 |
| 50 | 57 | 58 | 58 | 58 | 58 |
| 60 | 67 | 68 | 68 | 68 | 68 |

Figure 8A:
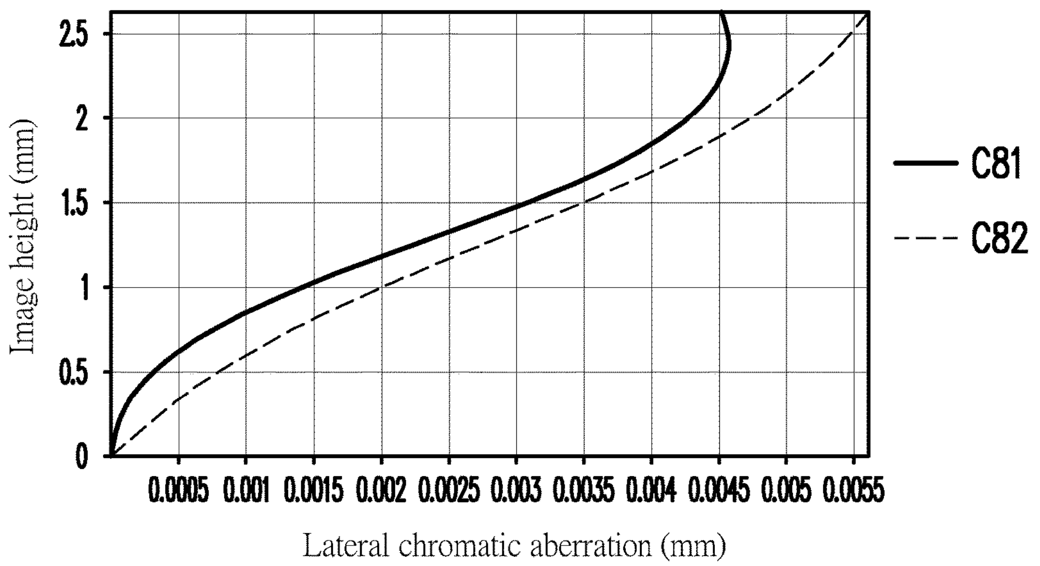
FIGS. 8A and 8B are diagrams of lateral chromatic aberration, field curvature, and distortion of an optical lens according to the fourth embodiment of the invention.
Figure 8B:
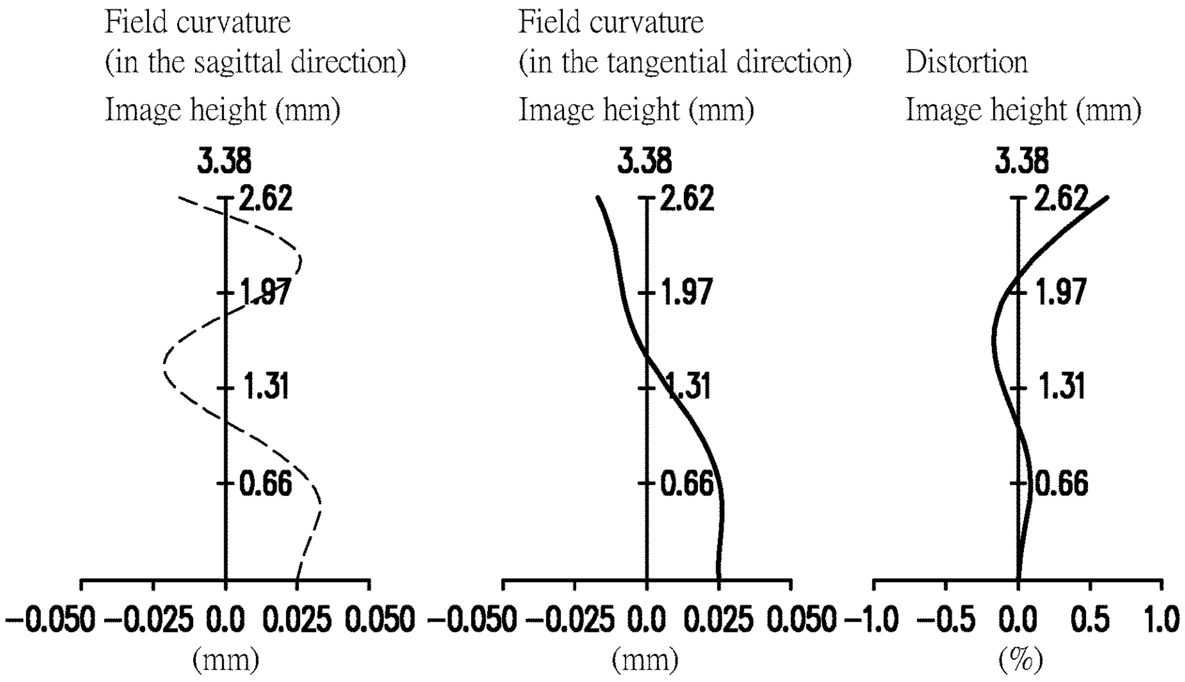

Also referring to FIGS. 8A and 8B, FIGS. 8A and 8B are diagrams of lateral chromatic aberration, field curvature, and distortion of an optical lens according to the fourth embodiment of the invention when the reference wavelength is 526 nm.

In the lateral chromatic aberration diagram of the fourth embodiment, the representative wavelengths are respectively 450 nm, 526 nm, and 625 nm. A curve C81 in FIG. 8A illustrates the chromatic aberration between the 450 nm wavelength and the 625 nm wavelength, and a curve C82 illustrates the chromatic aberration between the 450 nm wavelength and the 526 nm wavelength. It can be seen that the chromatic aberration between the representative wavelengths is small and the chromatic aberration of the optical lens 700 is good.

Figure 8C:
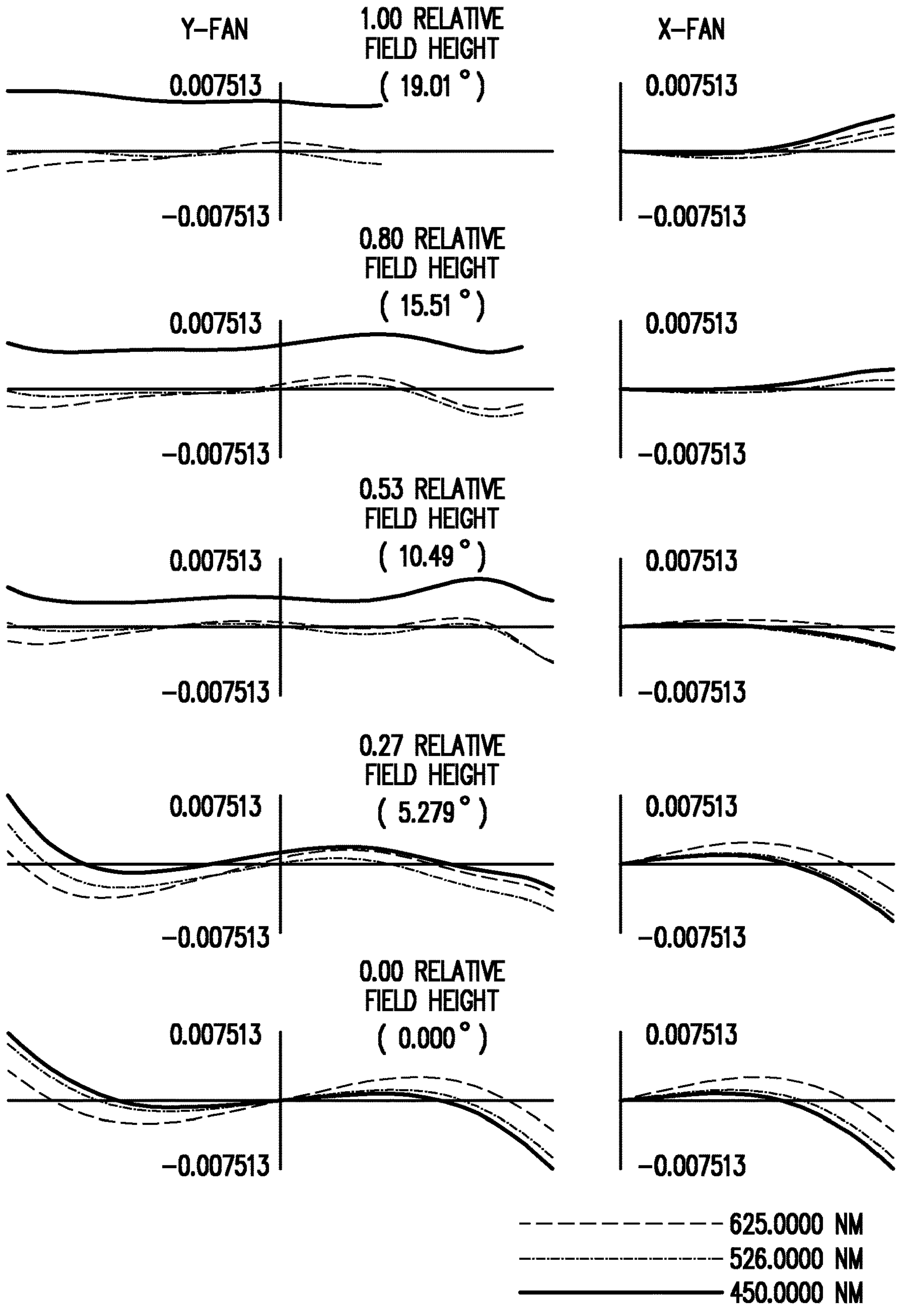
FIGS. 8C and 8D are diagrams of ray fan plots and modulation transfer function (MTF) graphs of an optical lens according to the fourth embodiment of the invention.
Figure 8D:
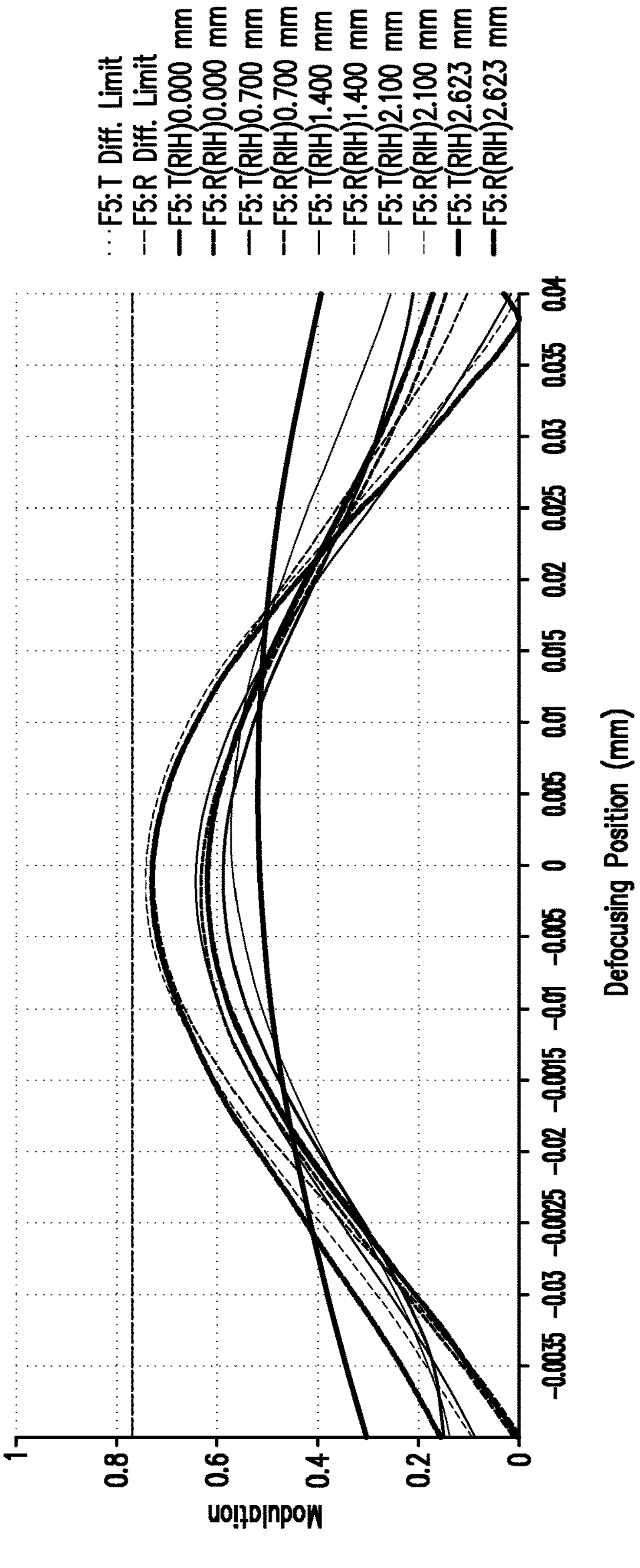
Figure 8E:
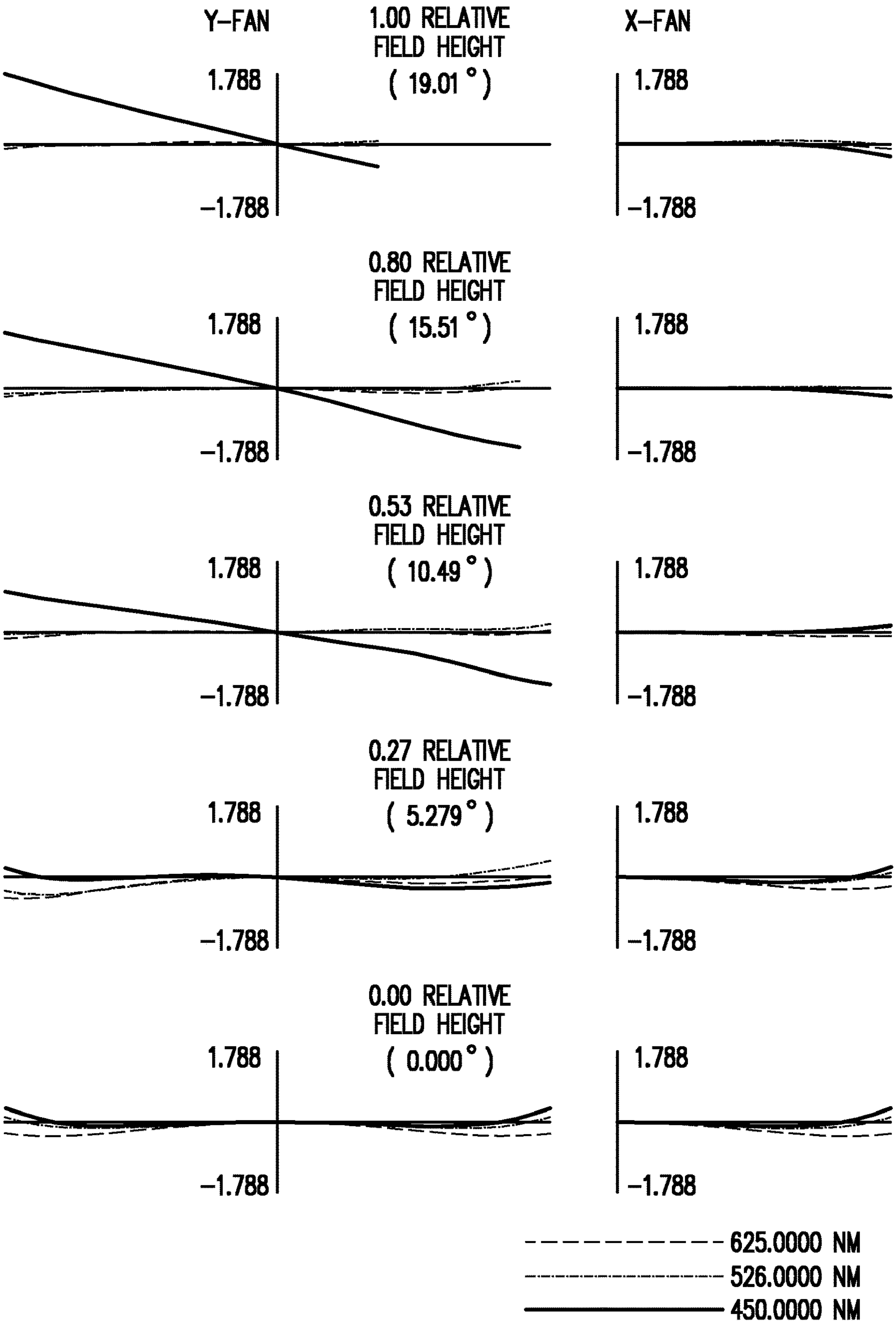
FIG. 8E is a diagram of an optical path difference of an optical lens according to the fourth embodiment of the invention.
Figure 9A:
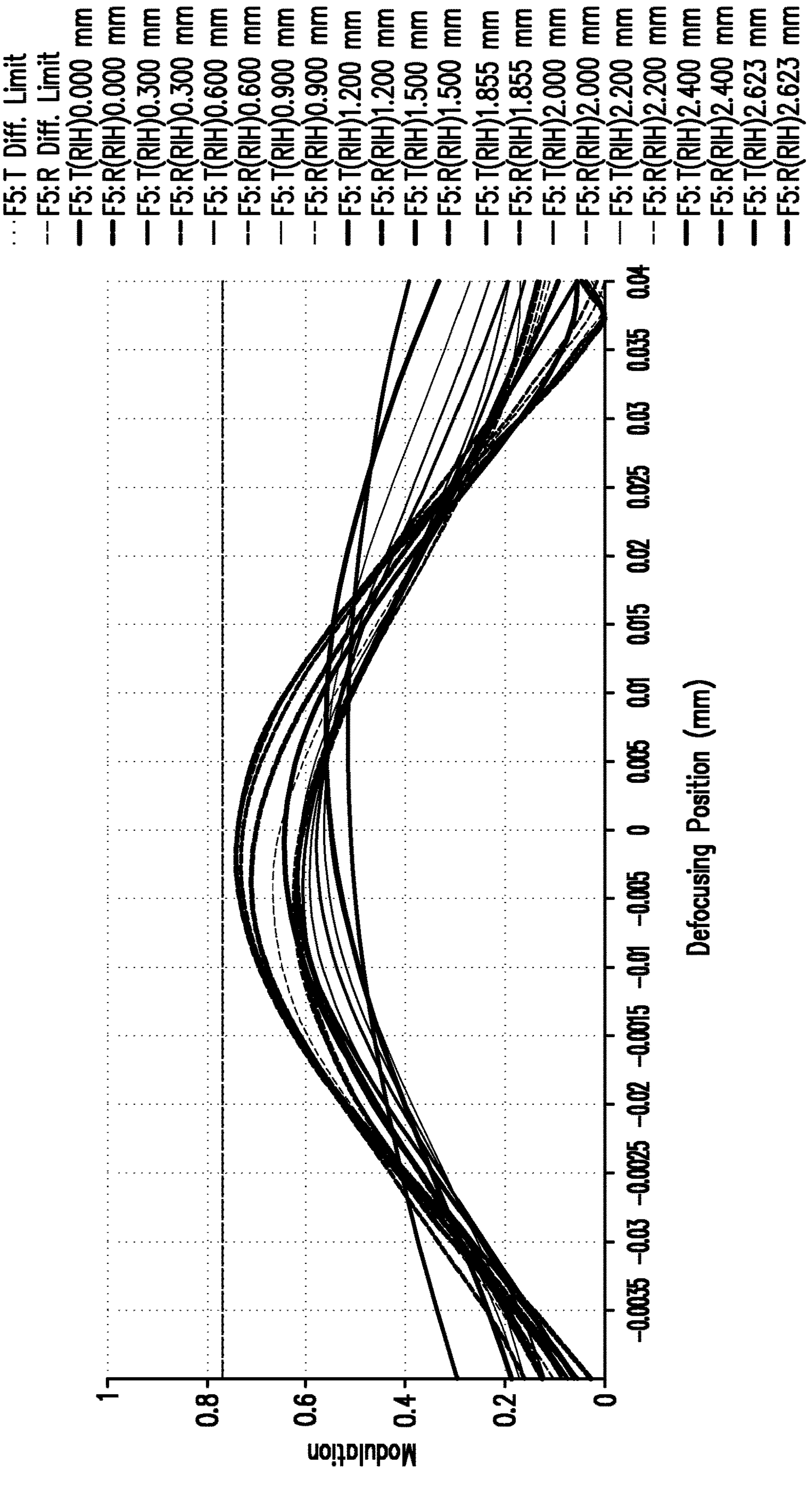
FIGS. 9A to 9G are diagrams of Through Focus MTF (TF-MTF) of an optical lens at different ambient temperatures according to the fourth embodiment of the invention.
Figure 9B:
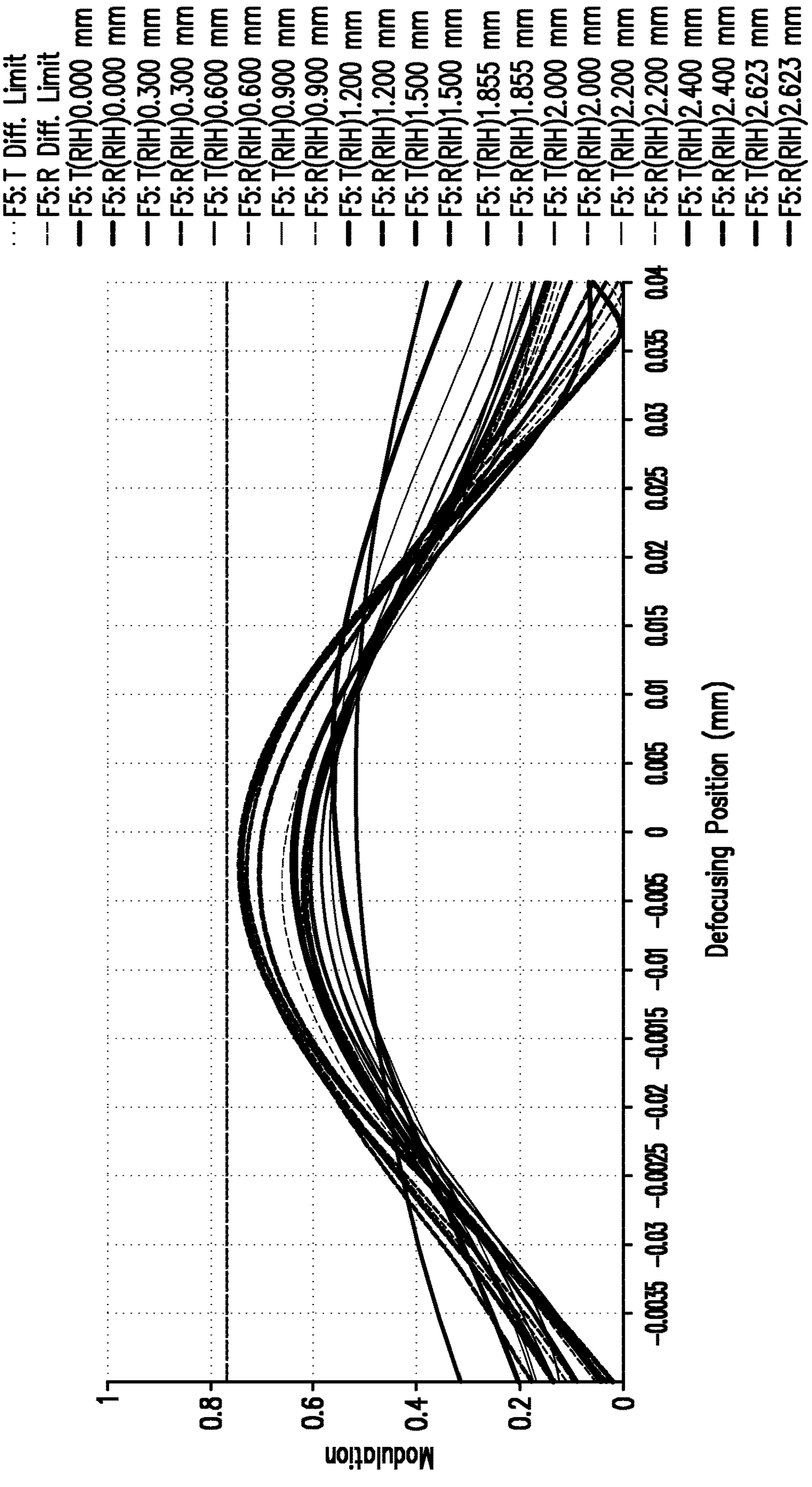
Figure 9C:
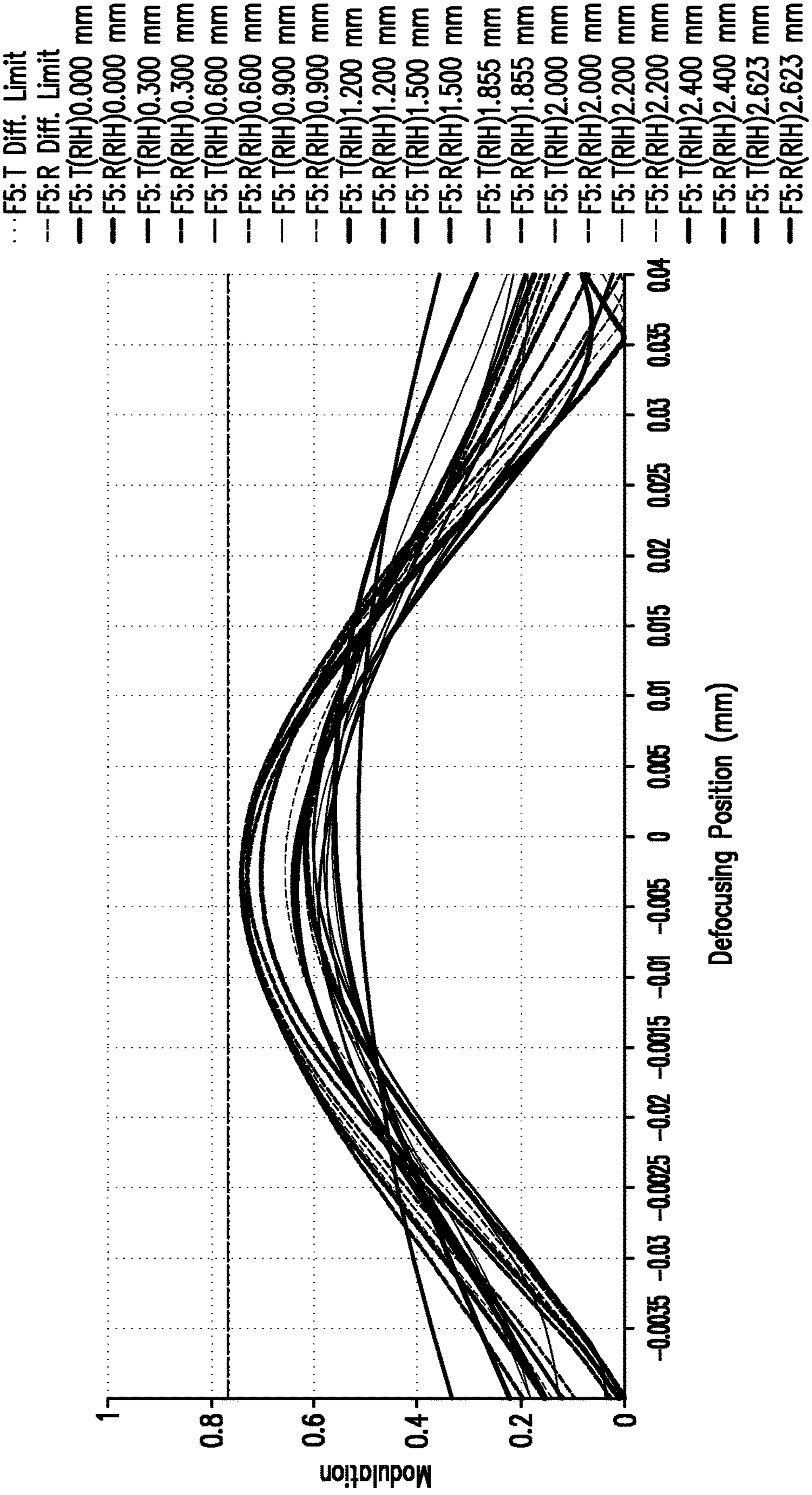
Figure 9D:
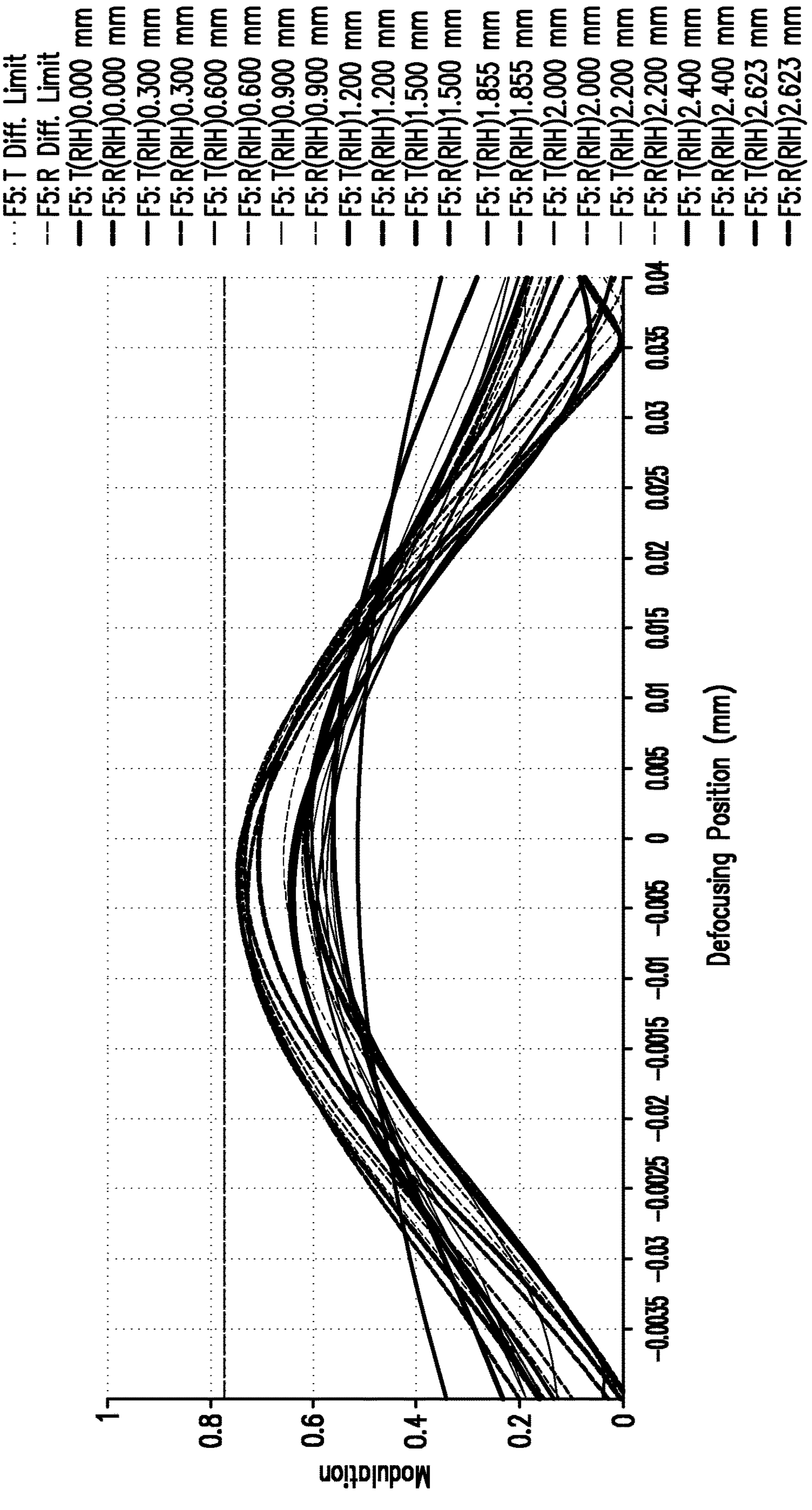
Figure 9E:
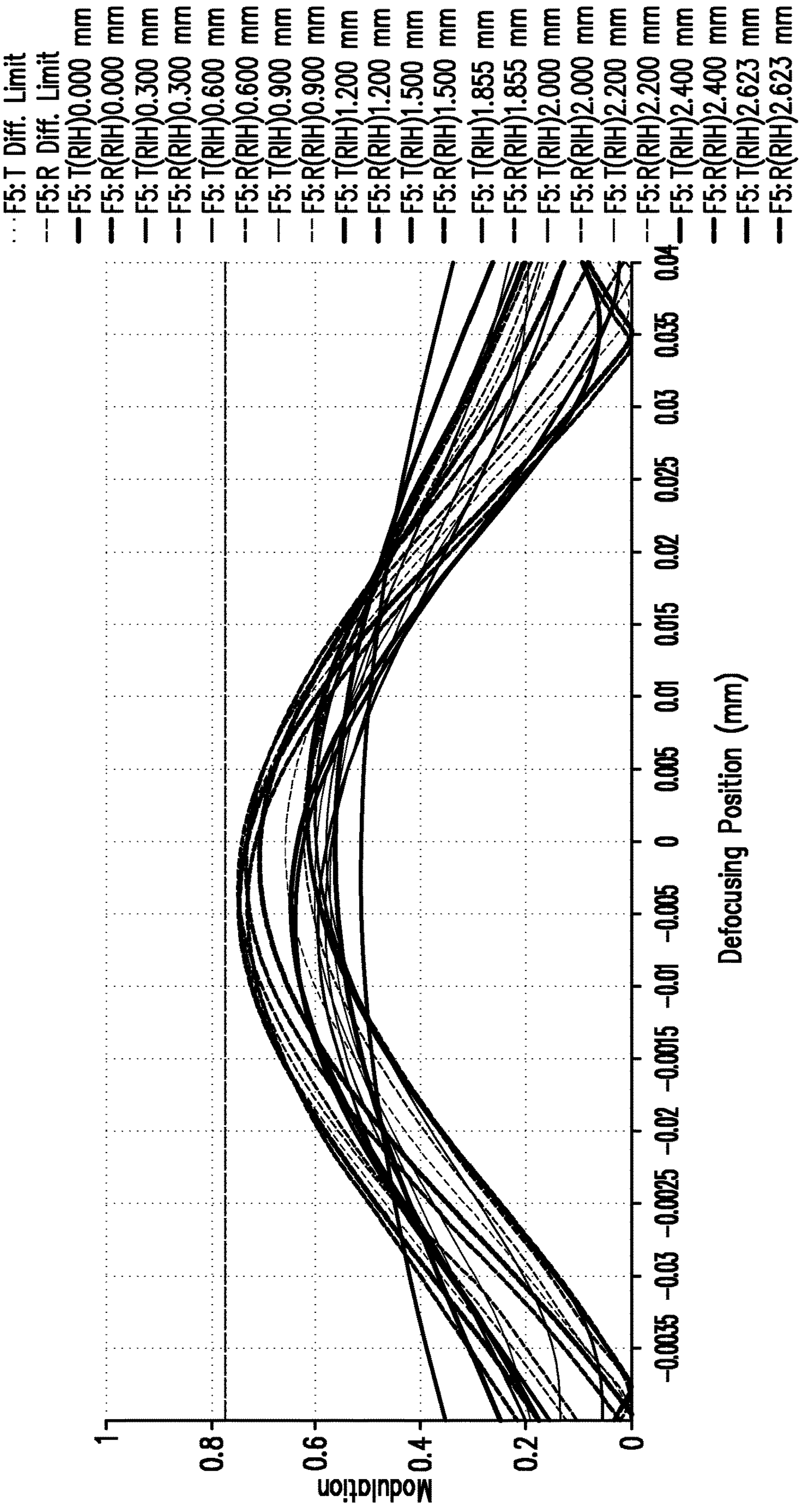
Figure 9F:
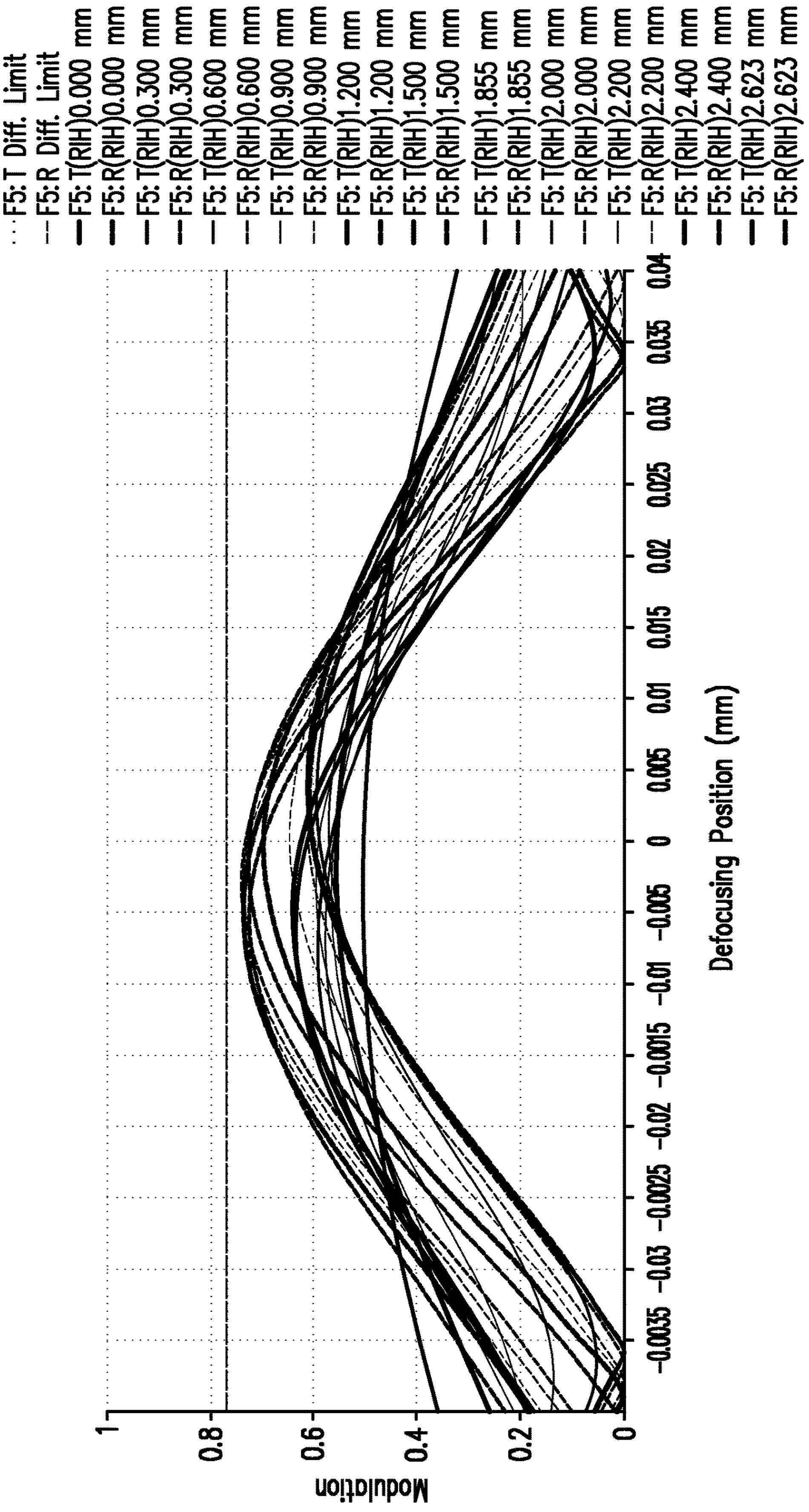
Figure 9G:
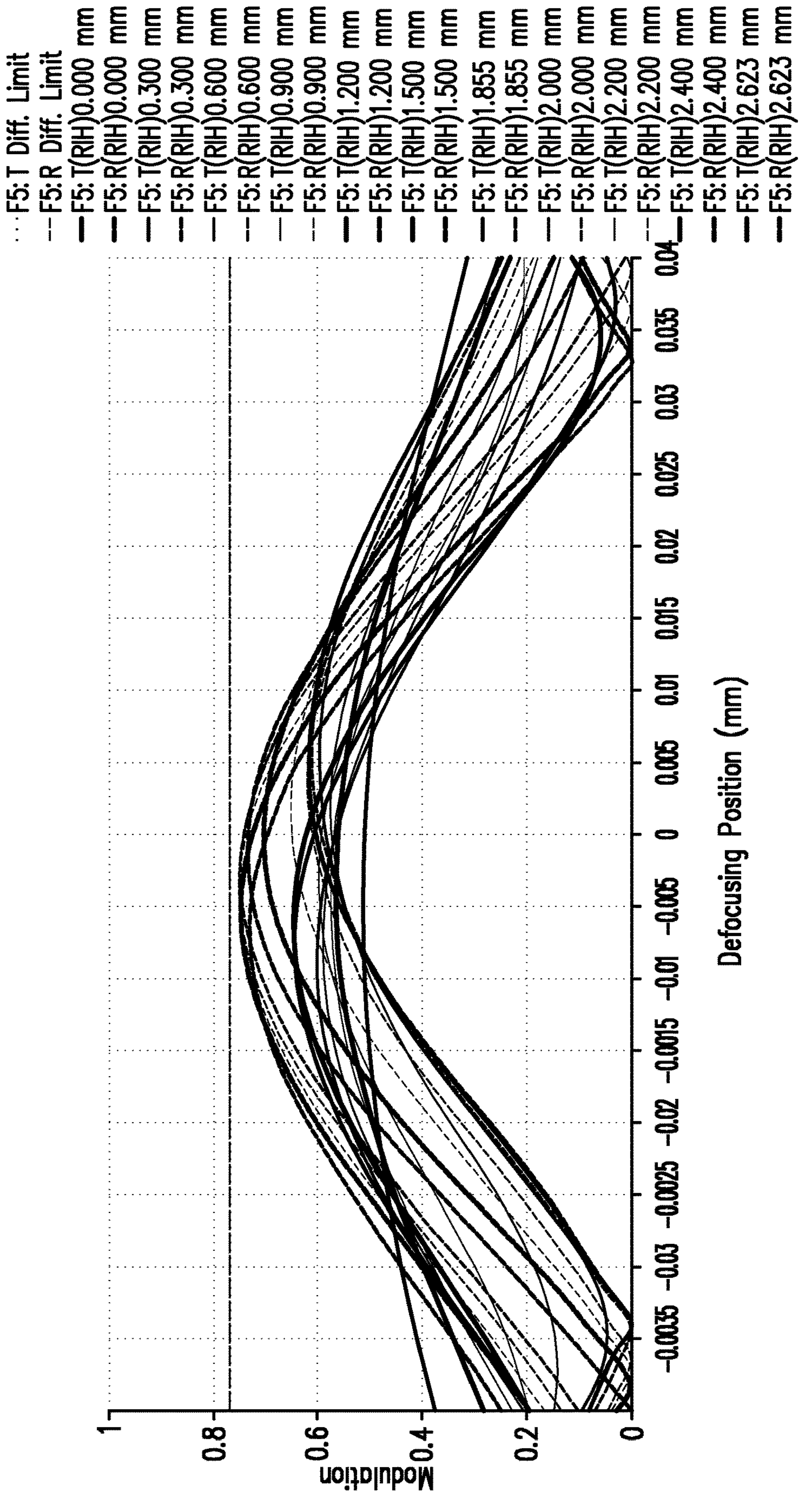

In the two field curvature aberration diagrams, the field curvature aberrations of the three representative wavelengths within the entire field of view fall within a preset range, indicating that the optical lens 700 of the fourth embodiment may effectively eliminate aberration. The distortion aberration diagram shows that the aberration of the fourth embodiment is maintained within a range of ±4%, indicating that the aberration of the fourth embodiment meets the imaging quality requirements of the optical lens. FIGS. 8C and 8D are diagrams of ray fan plots and modulation transfer function (MTF) graphs of an optical lens according to the fourth embodiment of the invention. The unit in FIG. 8C is mm. FIG. 8E is a diagram of an optical path difference of an optical lens according to the fourth embodiment of the invention. FIGS. 9A to 9G are diagrams of Through Focus MTF (TF-MTF) of an optical lens at different ambient temperatures according to the fourth embodiment of the invention. Accordingly, compared with a conventional optical lens, the fourth embodiment may still provide good imaging quality under the conditions that the maximum image height is 3.38 mm, and some of the lenses are plastic lenses. The optical lens 700 of the third embodiment may resolve images with a resolution of 116 lp/mm space.

Figure 10:
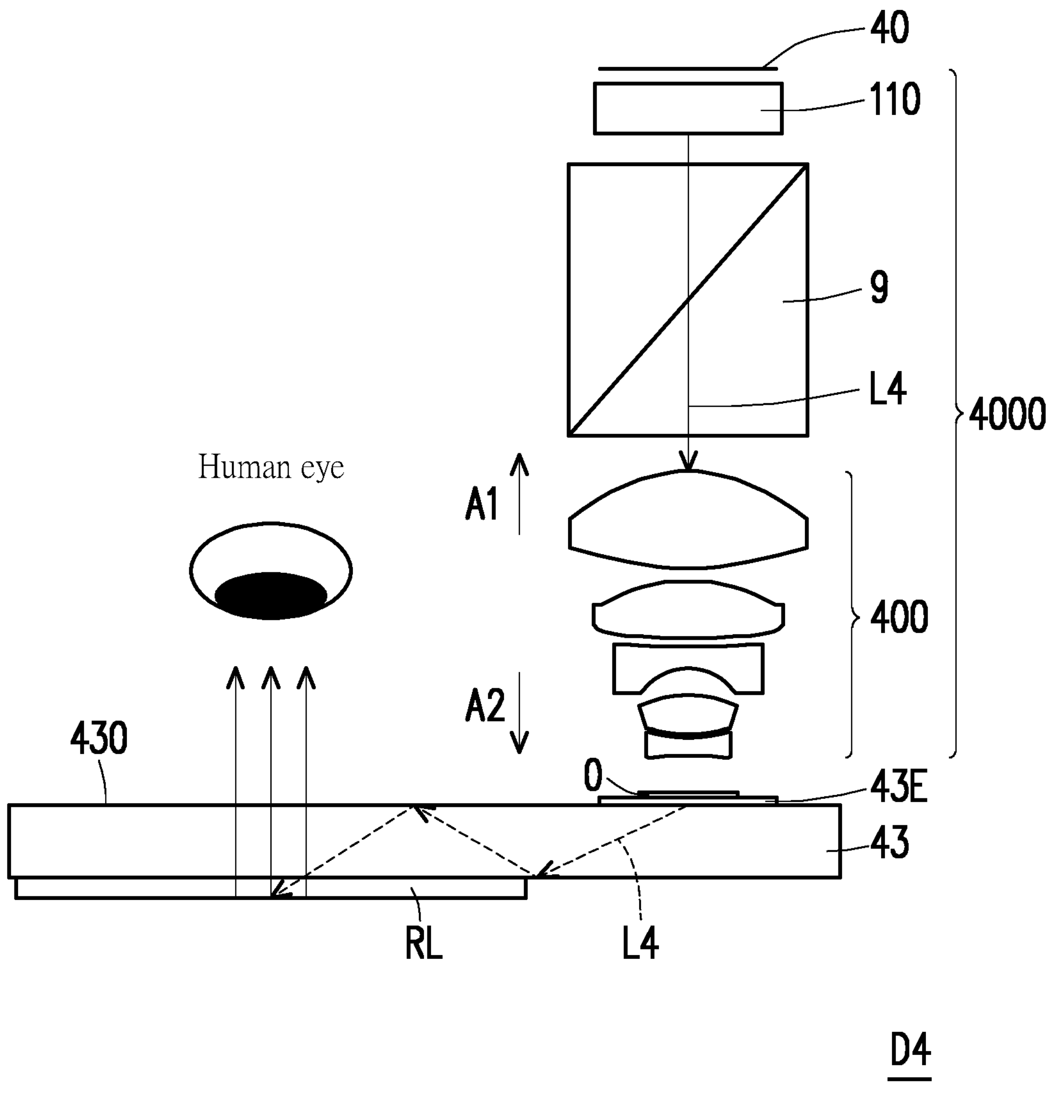
FIG. 10 is a schematic diagram of a display device according to the fourth embodiment of the invention.

FIG. 10 is a schematic diagram of a display device of the invention. A display device D4 includes an image projection module 4000 and a wave guide element 43. The image projection module 4000 includes an optical lens 400, the prism 9 and an image generator 40; the image generator 40 is disposed on the light incidence side A1 of the optical lens 400 to provide an image beam L4. The image projection module 4000 may be implemented by the image projection module 1000, 2000, or 3000, or 7000 as described in the first to fourth embodiments, and the optical lens 400 may be implemented corresponding to the optical lens 100, 200, or 300, or 700 in the first to fourth embodiments as described above. The image generator 40 may be implemented corresponding to the image source 10 as described in the first to fourth embodiments, and may be specifically implemented by a self-luminous image generator such as an organic light-emitting diode display, Micro LED display or a transmissive image generator such as a liquid crystal display. In other words, the display device D4 of this embodiment has a self-luminous (transmissive) panel architecture.

The wave guide element 43 is disposed on the light-emitting side A2 of the optical lens 400, and has a light coupling inlet 43E and a light coupling exit 43O. The light coupling inlet 43E and the light coupling exit 43O are configured to be disposed on the same surface of the wave guide element 43. The image projection module 4000 includes a reflective layer RL disposed on another surface of the wave guide element 43 and corresponds to the light coupling exit 43O. The stop 0 of the optical lens 400 is located at the light coupling inlet 43E of the wave guide element 43 or near the light coupling inlet 43E of the wave guide element 43. The image beam L4 from the optical lens 400 enters the wave guide element 43 via the light coupling inlet 43E, and the wave guide element 43 guides the image beam L4 so that the image beam L4 is totally reflected in the wave guide element 43. Then the image beam L4 is reflected by the reflective layer RL and is guided to leave the wave guide element 43 via the light coupling exit 43O and enters the human eye, forming a virtual image at a preset position in front of the human eye.

Figure 11:
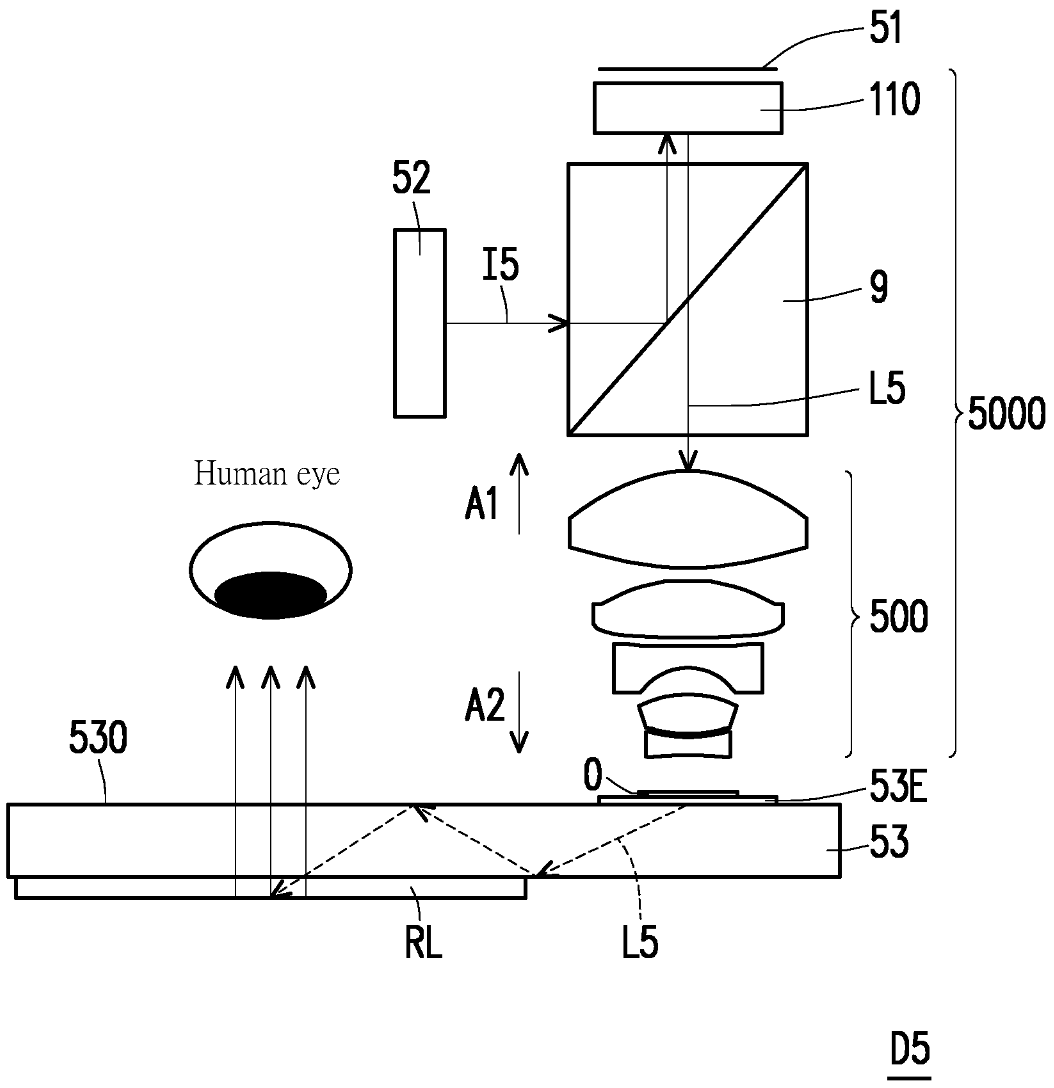
FIG. 11 is a schematic diagram of a display device according to the fifth embodiment of the invention.

FIG. 11 is a schematic diagram of a display device according to another embodiment of the invention. A display device D5 includes an image projection module 5000, an illumination light source 52, and a wave guide element 53; the image projection module 5000 includes an optical lens 500, the prism 9 and an image generator 51. The image generator 51 is a reflective image generator, which may be specifically implemented by a liquid crystal on silicon panel or a digital micromirror device. The illumination light source 52 generates an illumination light beam L5. After the illumination light beam L5 is guided to the image generator 51 via the prism 9, the illumination light beam L5 is reflected by the image generator 51 to form an image beam L5. The image generator 51 is disposed on the light incidence side A1 of the optical lens 500 to provide the image beam L5. The image projection module 5000 may be implemented by the image projection module 1000, 2000, 3000, or 7000 as described in the first to fourth embodiments, the optical embodiment lens 500 may be implemented corresponding to the optical lens 100, 200, 300, or 700 in the first to the fourth embodiments as described above, and the image generator 51 may be implemented corresponding to the image source 10 in the first to the fourth embodiments as described above. The display device D5 of this embodiment has a reflective panel architecture.

The wave guide element 53 is disposed on the light-emitting side A2 of the optical lens 500, and has a light coupling inlet 53E and a light coupling exit 53O. The light coupling inlet 53E and the light coupling exit 53O are configured to be disposed on the same surface of the wave guide element 53. The image projection module 5000 includes a reflective layer RL disposed on another surface of the wave guide element 53 and corresponds to the light coupling exit 53O. The stop 0 of the optical lens 500 is located at the light coupling inlet 53E of the wave guide element 53 or near the light coupling inlet 53E of the wave guide element 53. The image beam L5 from the optical lens 500 enters the wave guide element 53 via the light coupling inlet 53E, and the wave guide element 53 guides the image beam L5 so that the image beam L5 is totally reflected in the wave guide element 53. Then the image beam L5 is reflected by the reflective layer RL and is guided to leave the wave guide element 53 via the light coupling exit 53O and enters the human eye, forming a virtual image at a preset position in front of the human eye.

In summary, the optical lens provided by an embodiment of the invention includes a glass lens and a plastic lens, and satisfies the condition of $0.5\ \text{EFL} < \text{EFL}_G < 2\ \text{EFL}$, where EFL is the effective focal length of the optical lens, and $\text{EFL}_G$ is the effective focal length of all glass lenses. The optical lens may resolve images with a spatial resolution of 116 lp/mm and has a small thermal drift. The display device provided by an embodiment of the invention has good optical performance.

The above only shows preferred embodiments of the invention, and cannot be used to limit the scope of implementation of the invention. That is to say, all simple equivalent changes and modifications made in accordance with the claims and the content of the specification of the present invention still fall within the scope of the patent application. In addition, any embodiment or claim of the invention does not have to achieve all the purposes or advantages or features disclosed in the invention. In addition, the abstract and title of the invention are only used to assist patent search, and are not used to limit the scope of the invention. In addition, the terms “first” and “second” mentioned in this specification or claims are only used to name the elements or to distinguish between different embodiments or scopes, and are not used to limit the upper or lower limit of the number of elements.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens, comprising a first lens, a second lens, a third lens, a fourth lens, and a fifth lens with refracting power in order from a light incidence side to a light-emitting side along an optical axis, wherein the optical lens comprises at least one glass lens and at least one plastic lens, wherein the first lens has a positive refracting power, the second lens has a positive refracting power, and the third lens has a negative refracting power, the optical lens satisfies a condition of $0.5EFL<EFL_G<2EFL$, EFL is an effective focal length of the optical lens, and $EFL_G$ is an effective focal length of all glass lenses in the first lens to the fifth lens, and the optical lens is adapted for receiving an image beam from the light incidence side, such that the image beam forms a stop on the light-emitting side after passing through the optical lens, the stop is formed at a position where the image beam has a minimum cross-sectional area.

2. The optical lens according to claim 1, wherein an abbe number of the first lens is greater than 40, an abbe number of the second lens is greater than 40, and an abbe number of the third lens is less than 30.

3. The optical lens according to claim 1, wherein the first lens is a glass aspheric lens.

4. The optical lens according to claim 3, wherein the second lens, the third lens, the fourth lens, and the fifth lens are plastic aspheric lenses.

5. The optical lens according to claim 3, wherein the fourth lens has a positive refracting power, and the fifth lens has a negative refracting power.

6. The optical lens according to claim 3, wherein the second lens and the third lens are glass spherical lenses, and the fourth lens and the fifth lens are plastic aspheric lenses.

7. The optical lens according to claim 3, wherein the fourth lens has a negative refracting power, and the fifth lens has a positive refracting power.

8. The optical lens according to claim 1, wherein the second lens is a glass aspheric lens.

9. The optical lens according to claim 8, wherein the first lens, the third lens, the fourth lens, and the fifth lens are plastic aspheric lenses.

10. The optical lens according to claim 8, wherein the fourth lens has a negative refracting power, and the fifth lens has a positive refracting power.

11. The optical lens according to claim 1, wherein the first lens and the second lens are biconvex lenses.

12. The optical lens according to claim 1, wherein at least one of the fourth lens and the fifth lens has an abbe number greater than 50.

13. The optical lens according to claim 1, wherein a field of view of the optical lens is less than or equal to 51.4 degrees.

14. The optical lens according to claim 1, wherein the second lens and the third lens are combined into a cemented lens.

15. The optical lens according to claim 3, wherein the fourth lens has a positive refracting power, and the fifth lens has a positive refracting power.

16. The optical lens according to claim 15, wherein the fourth lens is a glass aspheric lens, and the first lens, the second lens, the third lens and the fifth lens are plastic aspheric lenses.

17. A display device, wherein the display device comprises the optical lens according to claim 1, an image generator, and a wave guide element, wherein the image generator is disposed on the light incidence side of the optical lens to provide the image beam; and the wave guide element is disposed on the light-emitting side of the optical lens and has a light coupling inlet and a light coupling exit, the image beam from the optical lens enters the wave guide element via the light coupling inlet, and the wave guide element guides the image beam so that the image beam leaves the wave guide element via the light coupling exit.

18. The display device according to claim 17, wherein the stop is located at the light coupling inlet of the wave guide element or near the light coupling inlet of the wave guide element.

19. The display device according to claim 17, wherein the display device further comprises a prism disposed on a path of the image beam and located between the image generator and the optical lens.

20. The display device according to claim 19, wherein the display device further comprises an illumination light source, wherein the image generator is a reflective image generator, the illumination light source generates an illumination light beam, and the illumination light beam is guided to the image generator via the prism, and the image generator receives the illumination light beam to generate the image beam and the image beam is reflected by the image generator to the optical lens.

* * * * *